US006919985B2

(12) United States Patent
Furukawa et al.

(10) Patent No.: US 6,919,985 B2
(45) Date of Patent: Jul. 19, 2005

(54) OPTICAL WAVELENGTH CONVERTING APPARATUS AND OPTICAL WAVELENGTH CONVERTING METHOD

(75) Inventors: Yukio Furukawa, Kanagawa (JP); Hajime Sakata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 10/364,522

(22) Filed: Feb. 12, 2003

(65) Prior Publication Data

US 2003/0151797 A1 Aug. 14, 2003

(30) Foreign Application Priority Data

Feb. 13, 2002 (JP) ........................................ 2002-035957
Jan. 23, 2003 (JP) ........................................ 2003-014328

(51) Int. Cl.[7] .............................. G02F 1/35; G02F 1/39
(52) U.S. Cl. ........................................ 359/326; 359/330
(58) Field of Search ................................ 359/326–332; 385/122; 372/21–22

(56) References Cited

U.S. PATENT DOCUMENTS

| | | | | |
|---|---|---|---|---|
| RE35,215 E | * | 4/1996 | Waarts et al. ................ | 372/108 |
| 5,519,802 A | * | 5/1996 | Field et al. .................. | 385/129 |
| 5,809,048 A | * | 9/1998 | Shichijyo et al. ............. | 372/32 |
| 5,912,910 A | * | 6/1999 | Sanders et al. ............... | 372/22 |
| 6,507,594 B1 | | 1/2003 | Furukawa et al. ............ | 372/36 |
| 6,697,392 B2 | * | 2/2004 | Ishino .......................... | 372/22 |
| 2003/0016715 A1 | | 1/2003 | Furukawa et al. ............ | 372/50 |

FOREIGN PATENT DOCUMENTS

JP          6-175180          6/1994          ........ 398/FOR 106

* cited by examiner

*Primary Examiner*—John D. Lee
(74) *Attorney, Agent, or Firm*—Fitzpatrick, Cella, Harper & Scinto

(57) ABSTRACT

An optical wavelength converting apparatus comprising first and second light sources and a nonlinear optical material. Beams from the two light sources, incident on the material, generate sum frequency light of these beams. The nonlinear optical material is provided with a periodic structure that matches phases of the beams from the two light sources with a phase of the sum frequency light of these beams. Also, wavelengths of the beams from the two light sources and of the sum frequency light of these beams, polarization directions of these three beams in the material, and propagation directions of these three beams in the material are determined such that an efficiency of conversion into sum frequency light does not change even with a change in one of the defining parameters, thus providing an advantageous pumping light source.

12 Claims, 12 Drawing Sheets

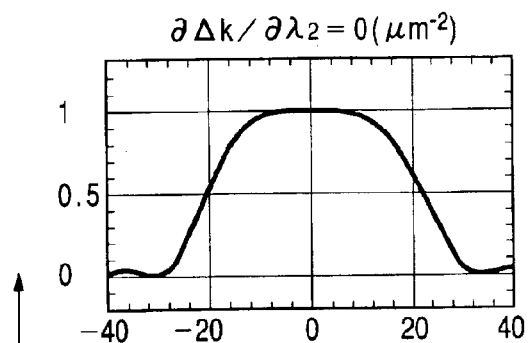

FIG. 2A
$\partial \Delta k / \partial \lambda_2 = 0 \, (\mu m^{-2})$

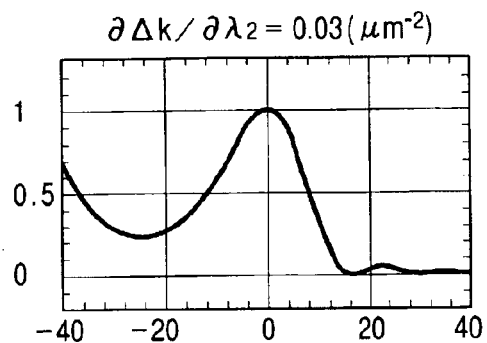

FIG. 2D
$\partial \Delta k / \partial \lambda_2 = 0.03 \, (\mu m^{-2})$

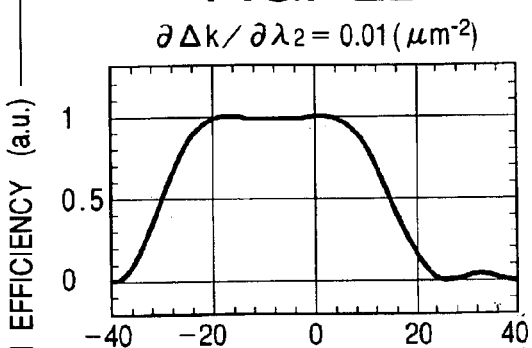

FIG. 2B
$\partial \Delta k / \partial \lambda_2 = 0.01 \, (\mu m^{-2})$

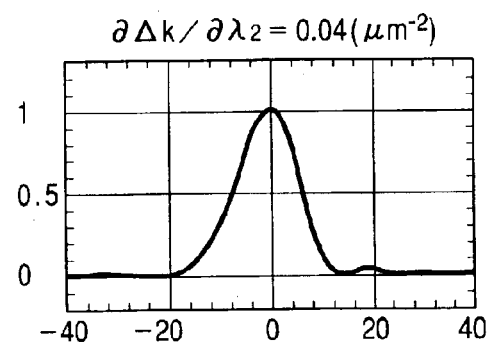

FIG. 2E
$\partial \Delta k / \partial \lambda_2 = 0.04 \, (\mu m^{-2})$

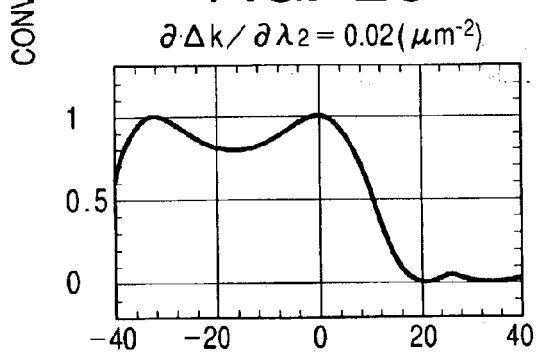

FIG. 2C
$\partial \Delta k / \partial \lambda_2 = 0.02 \, (\mu m^{-2})$

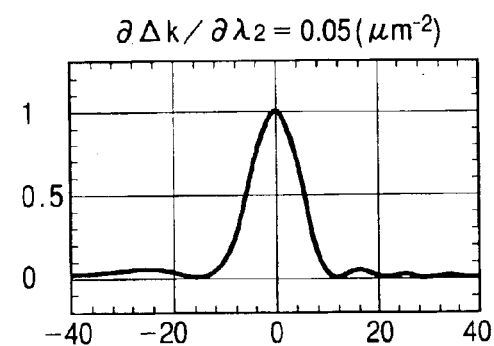

FIG. 2F
$\partial \Delta k / \partial \lambda_2 = 0.05 \, (\mu m^{-2})$

SHIFT FROM DESIGN VALUE OF WAVELENGTH OF SECOND SEMICONDUCTOR LASER (nm)

OPTICAL WAVELENGTH CONVERTING APPARATUS AND OPTICAL WAVELENGTH CONVERTING METHOD

BACKGROUND OF THE INVENTION

1. Field of the Invention

The present invention relates to an optical wavelength converting apparatus and an optical wavelength converting method that carries out wavelength conversion by subjecting two beams from different light sources such as different semiconductor lasers (Laser Diodes: LDs) to sum frequency generation. More specifically, the present invention relates to an optical wavelength converting apparatus which can be utilized as a light source for laser display, optical recording, or optical measurement, which can be driven for high-speed modulation, and which can emit green laser light.

2. Related Background Art

Many attempts have been made to use nonlinear optical material to convert LD light so as to have a different wavelength. This technique provides a light source that generates laser light with a wavelength region with which no LDs have been successfully put to practical use, for example, a green or ultraviolet region. This light source is expected to be used for laser display or optical recording.

A combination of a diode pumped solid state laser (DPSS laser) and nonlinear optical material is a known method of generating green laser light using nonlinear optical material. With this method, a laser crystal such as Nd:YAG is pumped using LD light of wavelength 808 nm to oscillate laser light of wavelength 1,064 nm (DPSS laser). Then, nonlinear optical material such as KTP (KTiOPO$_4$) is irradiated with this light to generate a second-harmonic to emit laser light of wavelength 532 nm.

It is contemplated that nonlinear optical material may be directly irradiated with LD light of wavelength about 1,060 nm to generate a second-harmonic (530 nm). In this case, output light can be modulated by directly modulating the LD. As a result, high-speed modulation can be accomplished.

On the other hand, with a so-called sum frequency generating method, two LD beams of wavelengths $\lambda_1$, and $\lambda_2$ are allowed to be incident on nonlinear optical material to generate light with a wavelength $\lambda_3$ having a frequency equal to the sum of the two frequencies. This method is described in Japanese Patent Application Laid-Open No. 6-175180, for example. FIG. 15 shows an optical system used for this method. In the figures, reference numerals 401, 402, and 417 denote a modulation signal, a signaling LD, and an pumping LD, respectively. Two LD beams are incident, via an optical fiber 403 and a dichroic mirror 418, on nonlinear optical element 414 provided with a periodically poled layer 420. The two LD beams are converted into sum frequency light by the nonlinear optical element 414, and this light is emitted. Further, reference numerals 412, 413, 415, and 416 denote an optical parametric sum frequency converting device, a light receiving device, and a LiTaO$_3$ substrate, and an optical waveguide respectively. Reference numerals 419, 421, and 422 denote a lens, emitting section of the optical waveguide (from which sum frequency light P3 is output), and a filter (that absorbs pumping light P2 that has not been converted) respectively. Reference character P1 denotes signal light.

However, with this type of method using an DPSS laser, the fluorescence lifetime of YAG is about 0.23 ms. Accordingly, modulation is limited to several kHz, and this method is unsuitable for high-speed modulation. Consequently, an external modulator is required for modulation, thus limiting the reduction of size of the apparatus and increasing power consumption.

Further, with the method of generating a second-harmonic using LD light of wavelength 1,060 nm, the efficiency of conversion into a second-harmonic is sensitive to the wavelength of LD light and also depends on input power. Accordingly, the LD light source must provide high power and high wavelength stability (1 nm or less). Furthermore, to modulate light so as to obtain output light with high power, a modulation current with a large amplitude must be injected into the LD light source. This requires a laser driver compatible with a large current, thus increasing costs.

Moreover, also with the sum frequency generating method, the efficiency of conversion into sum frequency light is sensitive to the wavelength of LD light. Consequently, the two LD light sources must provide high wavelength stability (1 nm or less). Furthermore, the exciting LD must provide high power.

Accordingly, with the second-harmonic generating method or the sum frequency generating method, to allow the LD light source to provide high power and high wavelength stability, it is necessary to have a DFB (Distributed Feedback), DBR (Distributed Bragg Reflector), or other laser which is grated and which has a special device configuration that enables the injection of a large current. This increases laser production costs.

Further, in general, with the second-harmonic generating method or the sum frequency generating method, the conversion efficiency is sensitive to the temperature of the nonlinear optical material. Thus, a variation in the temperature of the nonlinear optical material must be limited to several ° C. or less. This requires special means such as a temperature control device, thus limiting the reduction of size of the apparatus and increasing costs and power consumption.

SUMMARY OF THE INVENTION

It is thus an object of the present invention to provide an optical wavelength converting apparatus having a configuration which allows an inexpensive LD having poor wavelength stability to be used as an pumping light source, which is suitable for size reduction, and which enables high-speed modulation to be carried out easily.

To accomplish this object, the present invention provides an optical wavelength converting apparatus comprising a first and second light sources (typically a first and second semiconductor lasers that can emit coherent light waves with high energy densities) and nonlinear optical material so that beams from the two light sources are allowed to be incident on the nonlinear optical material to generate sum frequency light of these beams, wherein the nonlinear optical material is provided with a periodic structure (a periodically poled structure, a periodic refractive index modulating structure, or the like) that matches phases of the beams from the two light sources with a phase of the sum frequency light of these beams, and wavelengths of the beams from the two light sources and of the sum frequency light of these beams, polarization directions of these three beams in the nonlinear optical material, and propagation directions of these three beams in the nonlinear optical material are determined such that an efficiency of conversion into sum frequency light does not change even with a change in at least one of a plurality of parameters (of these parameters, the wavelength of one of the light sources and the temperature (T) of the nonlinear optical material are important) defining the efficiency of conversion into sum frequency light.

Further, to accomplish the above object, the present invention provides a an optical wavelength converting method of using a first and second light sources and nonlinear optical material to allow beams from the two light sources to be incident on the nonlinear optical material to generate sum frequency light of these beams, wherein the nonlinear optical material is provided with a periodic structure that matches phases of the beams from the two light sources with a phase of the sum frequency light of these beams, and wavelengths of beams from the two light sources and of the sum frequency light of these beams, polarization directions of these three beams in the nonlinear optical material, and propagation directions of these three beams in the nonlinear optical material are determined such that an efficiency of conversion into sum frequency light does not change even with a change in at least one of a plurality of parameters defining the efficiency of conversion into sum frequency light.

BRIEF DESCRIPTION OF THE DRAWINGS

FIGS. 2A, 2B, 2C, 2D, 2E and 2F are graphs showing the dependence of conversion efficiency on the wavelength of a second semiconductor laser.

FIG. 9 is a graph in which FIGS. 7 and 8 are superimposed on each other to describe a fifth example.

DETAILED DESCRIPTION OF THE PREFERRED EMBODIMENTS

Figure 1:
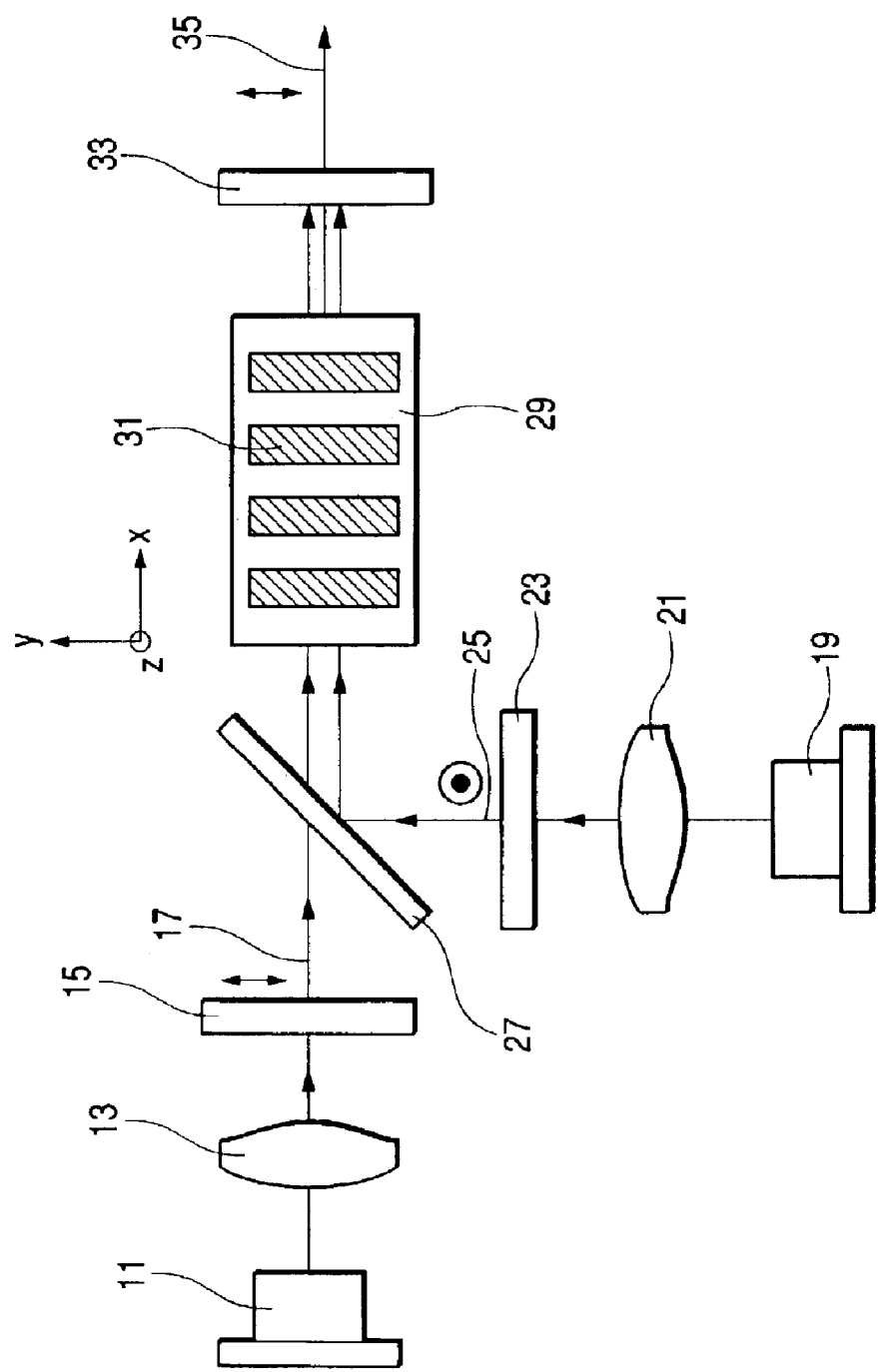
FIG. 1 is a schematic diagram of a configuration of an optical wavelength converting apparatus according to a first example of the present invention.

The action and principle of the present invention will be described taking by way of example the case in which a biaxial crystal such as KTP is used as nonlinear optical material. This description is also applicable to a uniaxial crystal in which two of the three refractive indices described below are equal.

The principal axes in the nonlinear optical material are an x, y, and z axes. In general, for a biaxial crystal, the axes are set so that refractive indices $n_x$, $n_y$, and $n_z$ for the principal axes are such that $n_x < n_y < n_z$. Furthermore, it is assumed that light propagates through the nonlinear optical material in a certain propagation direction (in a polar coordinate expression, an angle with the z axis is defined as $\theta$ and an axis with the x axis is defined as $\phi$). The wavelength of light from a first LD (light source) and the refractive index of the nonlinear optical material for this light are defined as $\lambda_1$ and $n_1$, respectively. The wavelength of light from a second LD (light source) and the refractive index of the nonlinear optical material for this light are defined as $\lambda_2$ and $n_2$, respectively. The wavelength of sum frequency light of these two beams and the refractive index of the nonlinear optical material for this light are defined as $\lambda_3$ and $n_3$, respectively.

Here, phase mismatch amount $\Delta k$ is defined by:

$$\Delta k = n_3(2\pi/\lambda_3) - n_1(2\pi/\lambda_1) - n_2(2\pi/\lambda_2) \qquad (1).$$

Moreover, the nonlinear optical material is provided with a periodic structure such as a periodically poled structure which matches the phases of beams from the two LDs (light sources) with the phase of sum frequency light of these beams. This period $\Lambda$ has only to be:

$$\Lambda = 2\pi/|\Delta k| = 1/|n_3/\lambda_3 - n_1/\lambda_1 - n_2/\lambda_2| \qquad (2)$$

However, if the periodic structure is such that the refractive index is modulated periodically, the refractive index $n_1$ and others are assumed to be averaged along the propagation direction.

Light with a wavelength $\lambda_i$ propagating through a biaxial crystal in a certain propagation direction can assume two basic propagation modes depending on the propagation direction. These propagation modes are referred to as modes 1 and 2, and their refractive indices are defined as $n^{(1)}$ and $n^{(2)}$. Here, the modes 1 and 2 are determined so that $n^{(1)} < n^{(2)}$.

It is arbitrary to set which propagation mode each of the wavelengths $\lambda_1$, $\lambda_2$, and $\lambda_3$ assumes. Specifically, light with a certain wavelength $\lambda_i$ may be propagated through the nonlinear optical material in a polarization state that provides a propagation mode to be selected. Then, the period of the periodic structure may be determined so as to the corresponding refractive index $n_i(m)$ (i=1, 2, 3, m (mode)=1, 2). In general, the propagation mode is selected for each wavelength so that the largest component of a nonlinear optical coefficient tensor contributes to the conversion efficiency. In the present invention, however, the propagation mode of each wavelength is selected so that the efficiency of conversion into sum frequency light does not change even with a change in at least one of the parameters ($\lambda_i$, T, $\theta$, $\phi$, and the like) defining the conversion efficiency.

Phase shift caused by a change in parameter is expressed by:

$$\delta = |\Delta k| - 2\pi/\Lambda \quad (3).$$

Without any changes, $\delta=0$. Here, propagation distance is defined as L. Then, as is well known, the conversion efficiency is proportional to:

$$\sin(\delta L/2)/(\delta L/2) \quad (4).$$

Thus, the conversion efficiency decreases with increasing absolute value of $\delta$. In the present invention, $\Delta k$ does not change even with a change in at least one of the parameters defining the conversion efficiency. That is, typically, the propagation mode of each beam with the wavelength $\lambda_1$, $\lambda_2$, or $\lambda_3$ is selected so that for the wavelength $\lambda_2$ of the second LD (light source), $$\partial \Delta k/\partial \lambda_2 = 0 \text{(approximately 0)} \quad (5)$$

or for the temperature T of the nonlinear optical material, $$\partial \Delta k/\partial T = 0 \text{(approximately 0)} \quad (6).$$

Thus, $\Delta k$ and $\delta$ do not substantially change even with a change in $\lambda_2$, i.e. the wavelength of the second LD (light source) or the temperature (T) of the nonlinear optical material. Therefore, the conversion efficiency is stabilized.

In short, the present invention is configured so that although the efficiency of conversion into sum frequency light depends on the phase shift $\delta$ (defined to include $\Delta k$ as shown in Equation (3)), $\Delta k$ does not substantially change even with a change in at least one of the parameters defining the conversion efficiency. As a result, the conversion efficiency is stabilized.

The right side of Equation (5) is approximately 0. However, specifically, the following condition is preferable:

$$|\partial \Delta k/\partial \lambda_2| \leq 0.05 \; (\mu m^{-2})$$

For example, FIG. 2 shows the dependence of $\lambda_2$ on the efficiency of conversion into sum frequency light which dependence was observed when $\partial \Delta k/\partial \lambda_2$ was changed from 0 to $0.05(\mu m^{-2})$ step by step on condition that a KTP crystal of crystal length 10 mm, the first semiconductor laser having an oscillation wavelength ($\lambda_1$) of about 1,610 nm and the second semiconductor laser having an oscillation wavelength ($\lambda_2$) of about 790 nm were used. As $\partial \Delta k/\partial \lambda_2$ increases, a wavelength band (wavelength tolerance required for $\lambda_2$) narrows. However, even if $\partial \Delta k/\partial \lambda_2 = 0.05$ $(\mu m^{-2})$, the wavelength tolerance is 10 nm or more with the full width at half maximum. This is sufficient in a practical sense.

Furthermore, the conversion efficiency is substantially fixed for a wavelength width of 10 nm or more provided that:

$$|\partial \Delta k/\partial \lambda_2| \leq 0.01 \; (\mu m^{-2}).$$

This is more advantageous in a practical sense.

Likewise, the right side of Equation (6) is approximately 0. However, specifically, the following condition is preferable:

$$|\partial \Delta k/\partial T| \leq 0.5 (K^{-1} cm^{-1})$$

In this case, the temperature tolerance is 10° C. or more with the full width at half maximum. This is sufficient in a practical sense.

Moreover, the conversion efficiency is substantially fixed for a temperature width of 10° C. or more provided that:

$$|\partial \Delta k/\partial T| \leq 0.1 (K^{-1} cm^{-1})$$

This is more advantageous in a practical sense.

Thus, with the optical wavelength converting apparatus and the optical wavelength converting method according to the present invention, typically, the phase shift $\delta$ from a designed value does not substantially change even with a change in the wavelength of the second LD or the temperature of the nonlinear optical material changes. Accordingly, the pumping second LD need not provide high wavelength stability and may thus be composed of a multi-longitudinal-mode LD, i.e. an inexpensive LD. Further, since the conversion efficiency does not substantially change even with a change in the temperature of the nonlinear optical material, the output can be stabilized even without any special temperature control devices.

The examples described below can be provided on the basis of the above described basic configuration.

The first LD may oscillate in a single-longitudinal mode, while the second LD may oscillate in a multi-longitudinal mode. Furthermore, the first LD may be a DFB or DBR laser, while the second LD may be a Fabry Perot laser or a broad area laser. With this configuration, if the second light source is used as a pumping LD, it desirably provides as high power as possible because the conversion efficiency depends on pumping light power. It is easy to realize a multi-longitudinal-mode LD with high power.

The first LD can be adapted to under modulation driving. The second LD can be adapted to be driven continuously. For modulation driving, one of the two light sources has only to be modulated. However, it is desirable that the first LD require smaller driving current and the first LD side be under modulation driving.

In particular, if the first LD is subjected to pulse modulation driving, output light is obtained only when beams from the two LDs are simultaneously incident on a nonlinear optical crystal. Consequently, the rise and fall times of output light depend on the rise and fall times of the LD beams. Thus, the optical pulse width of the output light can be determined accurately, thus making it possible to determine the safety class specified in the laser safety standard. Therefore, when the apparatus is mounted in a product, adequate safety means can be provided according to the class (if an external modulator such as an audio optical modulator is used, it provides analog modulation with slow rises and falls, and the optical pulse width of modulated light cannot be accurately determined easily).

Alternatively, an optical waveguide may be formed in the nonlinear optical material so as to extend along the propagation direction. That is, since the conversion efficiency depends on power density, the power density may be increased by using the optical waveguide structure to reduce the cross section of the propagation beam.

Typically, the nonlinear optical material may be $KTiOPO_4$ (KTP). If KTP is used to obtain green (wavelength region: 500 nm$\leq \lambda_3 \leq$550 nm) output light, then in order to meet Equation (5) to avoid changing the conversion efficiency in response to a change in the wavelength of the second LD (light source), the propagation modes of beams from the first and second LDs (light sources) and of the sum frequency light of these beams may be selected so as to use a component $d_{24}$ or $d_{15}$ or both of a nonlinear optical coefficient tensor $d_{ij}$ known to those skilled in the art as discussed, for example, in Handbook of Nonlinear Optical Crystals, Second, Revised and Updated Edition, by V.G. Dmitriev, et al., pages 23–25. Further, the appropriate wavelength of the first LD (light source) may be selected from the wavelength region 1,220 nm$\leq \lambda_1 \leq$1,745 nm. The appropriate wavelength of the second LD (light source) may selected from the wavelength region 701 nm≦λ$_2$≦1,002 nm. In this case, if the principal axes in the KTP are assumed to be an x, y, and z axes and if angles with the z and x axes are defined as θ and φ, respectively, when the propagation direction is represented using a polar coordinate system, then the propagation directions of the beams from the first and second LDs (light sources) and of the sum frequency light of these beams may be such that 64°≦θ≦90° and 0°<φ≦90°. In particular, for wavelength regions close to 1300 or 1550 nm, many DFB and DBR lasers with stable wavelengths have been developed for optical communication. These lasers can be used properly as the first LD (light source). Further, many high-power type LDs (Fabry Perot laser and broad area lasers) operating at a wavelength close to 800 nm have been widely developed for solid pumping. These lasers can be used properly as the second LD (light source).

More specifically, θ=90° and φ=0°, and the wavelengths of beams from the first and second LDs (light sources) and of the sum frequency light of these beams may be 1,519 nm≦λ$_1$≦1,745 nm, 701 nm≦λ$_2$≦862 nm, and 500 nm≦λ$_3$≦550 nm, respectively. Further, light from the first LD (light source) may be polarized in the direction of the y axis, light from the second LD (light source) may be polarized in the direction of the z axis, and sum frequency light may be polarized in the direction of the y axis. In this case, the component d$_{24}$ of the nonlinear optical coefficient tensor is used.

Alternatively, θ=90° and φ=90°, and the wavelengths of beams from the first and second LDs (light sources) and of the sum frequency light of these beams may be 1,220 nm≦λ$_1$≦1,421 nm, 772 nm≦λ$_2$≦1,002 nm, and 500 nm≦λ$_3$≦550 nm, respectively. Further, light from the first LD (light source) may be polarized in the direction of the x axis, light from the second LD (light source) may be polarized in the direction of the z axis, and sum frequency light may be polarized in the direction of the y axis. In this case, the component d$_{15}$ of the nonlinear optical coefficient tensor is used.

When the direction (θ, φ) of propagation in the nonlinear optical material is 0° or 90°, ∂Δk/∂θ=0 and ∂Δk/∂φ0. Accordingly, substantially no phase shifts occur even with an angular shift, so that the conversion efficiency does not substantially change. Thus, angular tolerance is high, thus relaxing the requirements for the accuracy of processing (cutting, polishing etc.) of the nonlinear optical material and for the alignment accuracy of each optical element. As a result, yield is improved.

Further, in particular, if KTP is used as the nonlinear optical material, then when the temperature of the nonlinear optical material is defined as T, the wavelengths of beams from the first and second LDs (light sources) and of the sum frequency light of these beams, polarization directions of these three beams in the nonlinear optical material, and propagation directions of these three beams in the nonlinear optical material may be determined so that |∂Δk/∂T|≦0.5 (K$^{-1}$cm$^{-1}$) (more desirably, ≦0.1(K$^1$cm$^{-1}$)). In this case, the conversion efficiency does not substantially change even with a change-in the temperature of the nonlinear optical material, the output can be stabilized even without any special temperature control devices.

More specifically, in order to obtain green (wavelength region: 500 nm≦λ$_3$≦550 nm) output light, the wavelengths of beams from the first and second LDs (light sources) and of the sum frequency light of these beams and the propagation and polarization directions of these three beams may be determined so as to use the component d$_{24}$ or d$_{15}$ or both of the nonlinear optical coefficient tensor d$_{ij}$ nonlinear optical material (KTP). Further, the propagation directions of beams from the first and second LDs (light sources) and of the sum frequency light of these beams may be set so that 79.1°≦θ≦90° and 20.4°≦φ≦27.6°, respectively. The wavelengths of beams from the first and second LDs (light sources) and of the sum frequency light of these beams may be set to be 1,460 nm≦λ$_1$≦1,745 nm, 701 nm≦λ$_2$≦882 nm, and 500 nm≦λ$_3$≦550 nm, respectively.

Furthermore, the nonlinear optical material may be KNbO$_3$(KN), LiNbO$_3$(LN), or LiTaO$_3$(LT) or the like.

The present invention will be described below using examples.

FIRST EXAMPLE

A first example of the present invention will be described below with reference to the drawings.

FIG. 1 is a schematic diagram of a configuration of an optical wavelength converting apparatus according to the first example of the present invention. In FIG. 1, reference numerals 11 and 19 denote a first and second LDs, reference numerals 13 and 21 denote collimate lenses, and reference numerals 15 and 23 denote half wavelength plates. Reference numerals 27 and 29 denote a dichroic mirror and nonlinear optical material consisting of a KTP crystal, respectively. Reference numerals 31 and 33 denote a periodically poled structure provided in the KTP and a wavelength filter, respectively.

In the present example, a yz face of the optically polished KTP crystal 29 is set as a light incoming and outgoing surface. In this case, the principal axes (x, y, and x axes) are set so that refractive indices n$_x$, n$_y$, and n$_z$ are such that n$_x$<n$_y$<n$_z$. Light propagates in the direction of the x axis. In the polar coordinate expression, θ (angle with the z axis)= 90° and φ (angle with the x axis)=0°.

If light propagates in this direction, two propagation modes are present: a propagation mode 1 having electric field components in the y axis direction and a propagation mode 2 having electric field components in the z axis direction. In this case, if a beam from the first LD (wavelength λ$_1$) is propagated in the propagation mode 1, a beam from the second LD (wavelength λ$_2$) is propagated in the propagation mode 2, and the sum frequency light of these beams (wavelength λ$_3$) is propagated in the propagation mode 1, then a wavelength range is present which meets Equation (5), described above.

Figure 3:
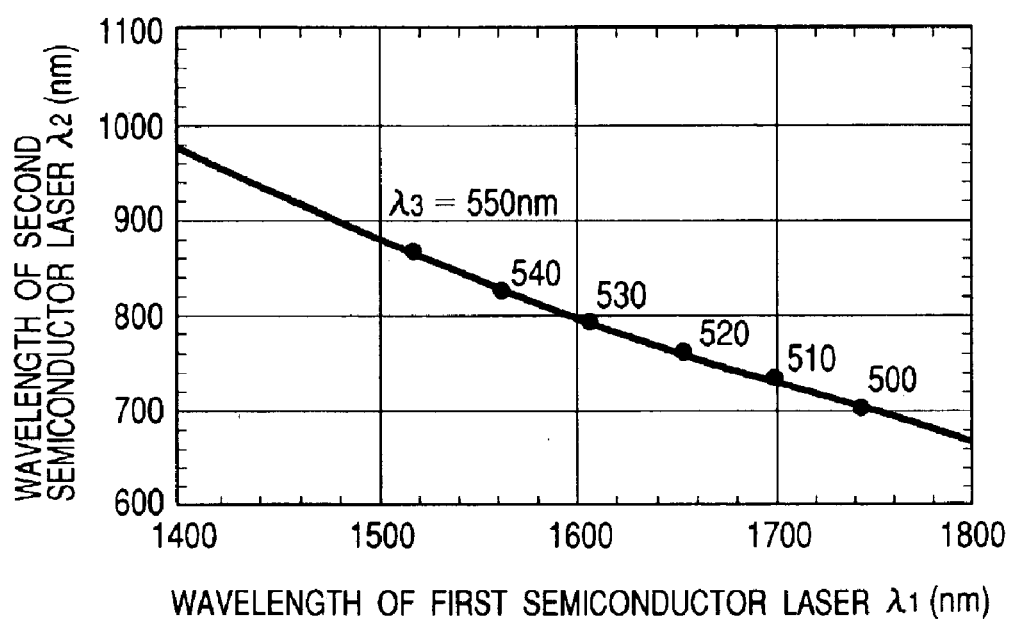
FIG. 3 is a graph showing the correlationship between the wavelengths of two semiconductor lasers according to the first example.

This is shown in FIG. 3. For example, to obtain a green laser light (500 nm≦λ$_3$≦550 nm) output, the wavelengths may be selected so that 1,519 nm≦λ$_1$≦1,745 nm and 701 nm≦λ$_2$≦862 nm. Then, an optical wavelength converting apparatus can be provided in which the conversion efficiency does not substantially change even with a change in the wavelength of the second LD 19. In this case, the component d$_{24}$ of the nonlinear optical coefficient tensor of KTP is used.

In the present example, the first LD 11 is a DFB laser of oscillation wavelength 1,610 nm and power 30 mW. The second LD 19 is a Fabry Perot laser of oscillation wavelength 790 nm and power 5 W. The first LD 11 oscillates in the single-longitudinal mode and has a variation in wavelength limited to 0.3 nm or less by temperature control. Further, the second LD 19 oscillates in the multi-longitudinal mode and has a spectral width of about 3 nm.

An LD beam 17 from the first LD 11 is adjusted by the half wavelength plate 15 so as to be polarized in the direction of y axis of the KTP crystal 29. Further, an LD beam 25 from the second LD 19 is adjusted by the half wavelength plate 23 so as to be polarized in the direction of z axis of the KTP crystal 29. The dichroic mirror 27 is designed to allow the LD beam 17 to pass through, while reflecting the LD beam 25.

The KTP crystal 29 is provided with the periodically poled structure 31 having a period (Λ) of 28.7 μm so as to match the phases of the LD beams 17 and 25 with the phase of the sum frequency light of these beams 35 (wavelength: 530 nm). The length of the crystal (L) is 20 nm. The wavelength filter 33 is designed to pass only light with a wavelength close to 530 nm to obtain only the sum frequency light 35.

As a result, it was possible to obtain green sum frequency light of power 1 mW and central wavelength 530 nm. The spectral width was about 1.3 nm, indicating that sum frequency conversion occurred on all wavelengths of the second LD beam 25 within a spectral width of 3 nm.

Further, when the wavelength of the second LD 19 was changed by ±10 nm, the conversion efficiency decreased to half. Thus, the wavelength tolerance width (full width at half maximum) of the second LD 19 was 20 nm, which is a sufficient value in a practical sense.

Furthermore, when the first LD 11 was subjected to pulse modulation driving at 500 MHz, sum frequency light 35 modulated at 500 MHz was obtained correspondingly.

Further, the configuration of the present example is characterized in that the KTP crystal has a relatively large temperature tolerance width (that is, in the present example, $|\partial \Delta k/\partial T|$ is relatively close to 0). When measurements were actually carried out while varying the temperature of the crystal, the conversion efficiency reached its peak at a crystal temperature of about 15° C. The conversion efficiency decreased to half of the peak value at a crystal temperature of 0° C. and 28° C. Thus, the temperature tolerance width (full width at half maximum) of the crystal was 28° C. This is a large value compared to the wavelength conversion method based on second-harmonic generation using LiNbO$_3$, wherein the temperature tolerance width is 1° C.·cm. That is, the configuration of the present example requires no adjustments of the crystal temperature or does no require strict temperature control. It has been found that this configuration is advantageous in producing apparatuses. In the present example, the first LD 11 is composed of a DFB laser that suppresses a variation in wavelength by controlling the temperature. However, the present invention is not limited to this aspect. For example, the first LD 11 may be, for example, a DBR laser of a multiple-electrode structure provided with a phase control area used to adjust the wavelength.

SECOND EXAMPLE

A second example of the present invention will be described below with reference to the drawings.

Figure 4:
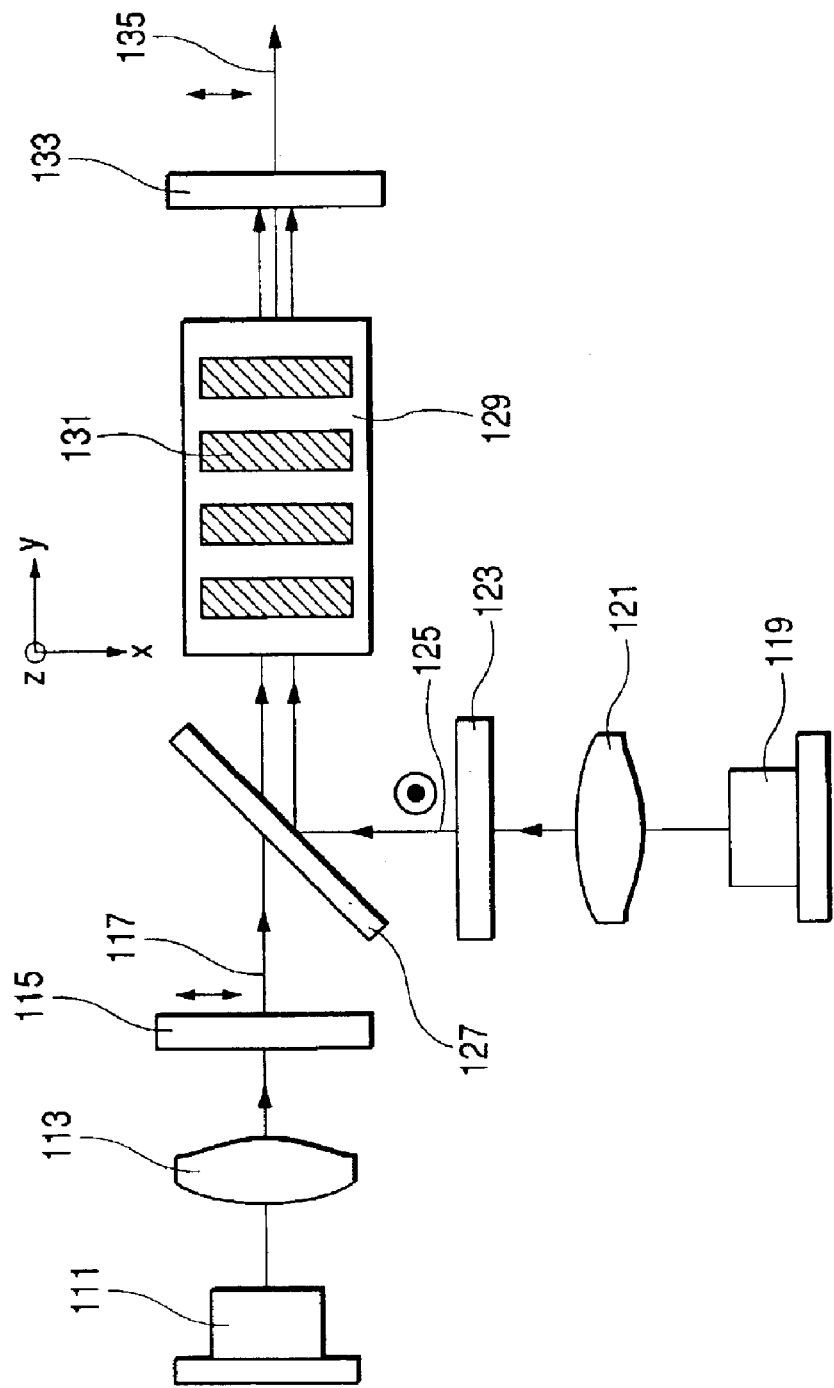
FIG. 4 is a schematic diagram of a configuration of an optical wavelength converting apparatus according to a second example of the present invention.

FIG. 4 is a schematic diagram of a configuration of an optical wavelength converting apparatus according to the second example of the present invention. In FIG. 4, reference numerals 111 and 119 denote a first and second LDs, reference numerals 113 and 121 denote collimate lenses, and reference numerals 115 and 123 denote half wavelength plates. Reference numerals 127 and 129 denote a dichroic mirror and nonlinear optical material consisting of a KTP crystal, respectively. Reference numerals 131 and 133 denote a periodically poled structure provided in the KTP and a wavelength filter, respectively.

In the present example, an xz face of the optically polished KTP crystal is used as a light incoming and outgoing surface. Light propagates in the direction of the y axis. In the polar coordinate expression, θ (angle with the z axis)=90° and φ (angle with the x axis)=90°.

If light propagates in this direction, two propagation modes are present: a propagation mode 1 having electric field components in the x axis direction and a propagation mode 2 having electric field components in the z axis direction. In this case, if a beam from the first LD 111 (wavelength $\lambda_1$) is propagated in the propagation mode 1, a beam from the second LD 119 (wavelength $\lambda_2$) is propagated in the propagation mode 2, and the sum frequency light of these beams (wavelength $\lambda_3$) is propagated in the propagation mode 1, then a wavelength range is present which meets Equation (5), described above.

Figure 5:
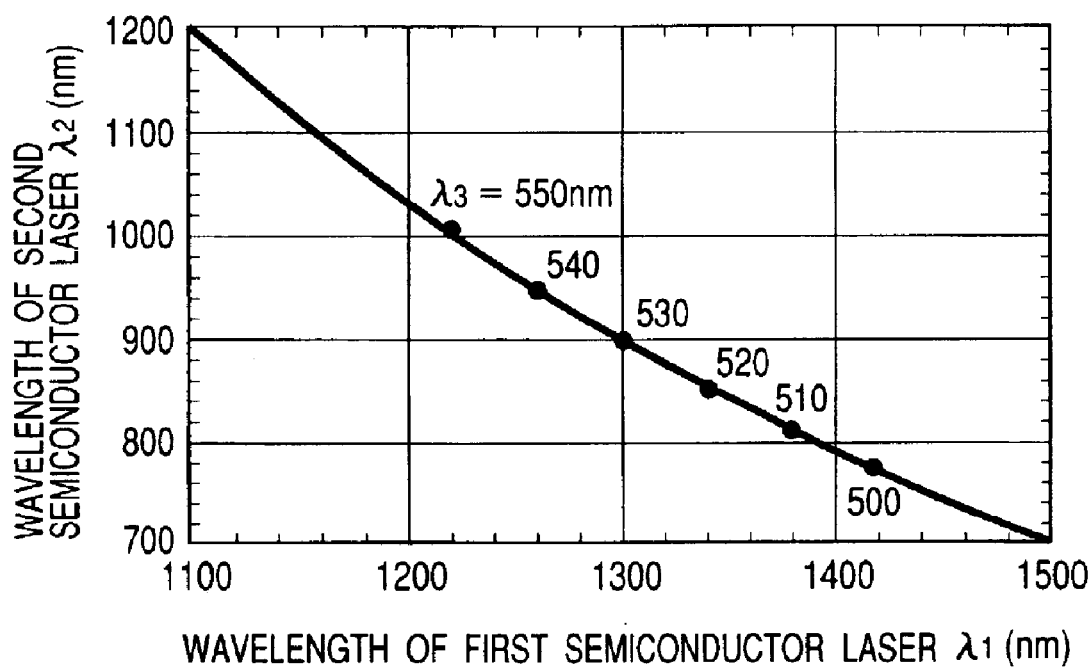
FIG. 5 is a graph showing the correlationship between the wavelengths of two semiconductor lasers according to the second example.

This is shown in FIG. 5. For example, to obtain green laser light (500 nm$\leq\lambda_3\leq$550 nm) output, the wavelengths may be selected so that 1,220 nm$\leq\lambda_1\leq$1,421 nm and 772 nm$\leq\lambda_2\leq$1002 nm. Then, an optical wavelength converting apparatus can be provided in which the conversion efficiency does not substantially change even with a change in the wavelength of the second LD 119. In this case, the component $d_{15}$ of the nonlinear optical coefficient tensor of KTP is used.

In the present example, the first LD 111 is a DFB laser of oscillation wavelength 1,303 nm and power 30 mW. The second LD 119 is a Fabry Perot laser of oscillation wavelength 893 nm and power 5 W. The first LD 111 oscillates in the single-longitudinal mode and has a variation in wavelength limited to 0.3 nm or less by temperature control. Further, the second LD 119 oscillates in the multi-longitudinal mode and has a spectral width of about 3 nm.

An LD beam 117 from the first LD 111 is adjusted by the half wavelength plate 115 so as to be polarized in the direction of x axis of the KTP crystal 129. Further, an LD beam 125 from the second LD 119 is adjusted by the half wavelength plate 123 so as to be polarized in the direction of z axis of the KTP crystal 129. The dichroic mirror 127 is designed to allow the LD beam 117 to pass through, while reflecting the LD beam 125.

The KTP crystal 129 is provided with the periodically poled structure 131 having a period of 32.9 μm so as to match the phases of the LD beams 117 and 125 with the phase of the sum frequency light 135 (wavelength: 530 nm of these beams). The length of the crystal is 20 nm. The wavelength filter 133 is designed to pass only light with a wavelength close to 530 nm to obtain only the sum frequency light 135.

As a result, it was possible to obtain green sum frequency light 135 of power 0.2 mW and central wavelength 530 nm. The spectral width was about 1.0 nm, indicating that sum frequency conversion occurred on all wavelengths of the second LD beam 125 within a spectral width of 3 nm.

Further, when the wavelength of the second LD 119 was changed by ±12 nm, the conversion efficiency decreased to half. Thus, the wavelength tolerance width (full width at half maximum) of the second LD 119 was 24 nm, which is a sufficient value in a practical sense.

Furthermore, when the first LD 111 was subjected to pulse modulation driving at 500 MHz, sum frequency light modulated at 500 MHz was obtained correspondingly.

With the configuration of the present example, the crystal 129 has a temperature tolerance width (full width at half maximum) of 7° C. This value is worse than that in the first example. However, it is still larger than that obtained with the wavelength conversion method based on second-harmonic generation using LiNbO$_3$. That is, the configuration of the present example does not require the crystal temperature to be controlled strictly.

The present example indicates that a wavelength range different from that in the first example also enables the provision of an optical wavelength converting apparatus according to the present invention.

THIRD EXAMPLE

In the first and second example, the light propagation direction (θ, φ) is 0° or 90°. However, the present invention is not limited to this aspect. A third example of the present invention relates to a configuration of another propagation direction using a KTP crystal.

Figure 7:
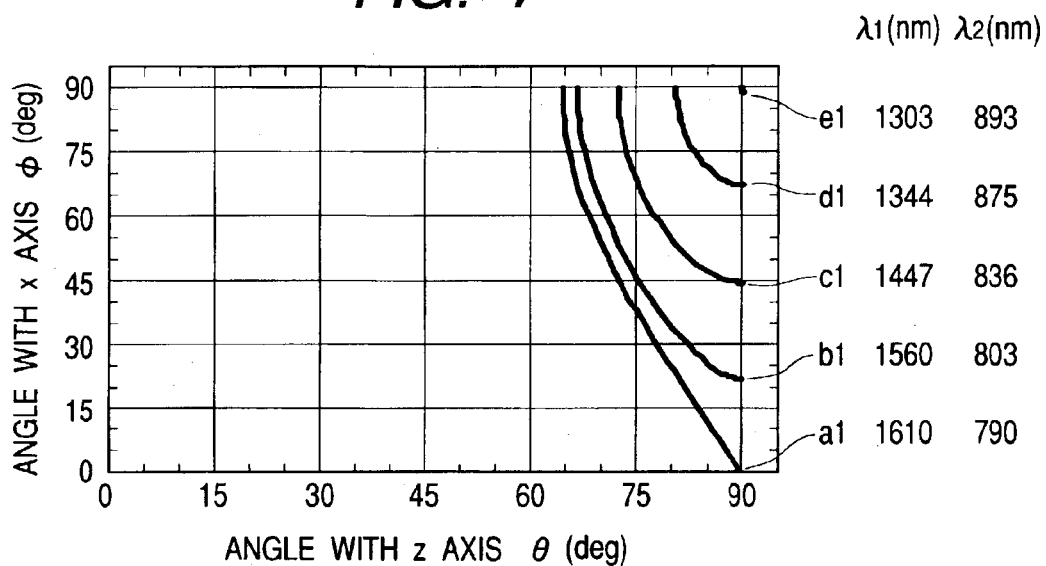
FIG. 7 is a graph showing the direction of propagation vs. the wavelengths of two semiconductor lasers according to the third example.

FIG. 7 shows the relationship between LD wavelengths ($\lambda_1$, $\lambda_2$) meeting Equation (5) and a certain propagation direction (θ, φ) in the case in which a first LD beam (wavelength $\lambda_1$) is propagated in the polarization direction of a mode 1, while the a second LD beam (wavelength $\lambda_2$) is propagated in the polarization direction of a mode 2, with the sum frequency light of these beams propagated in the polarization direction of the mode 1. In this case, $\lambda_3$=530 nm.

In FIG. 7, curve a1 indicates an example in which $\lambda_1$=1,610 nm and $\lambda_2$=790 nm. Curve b1 indicates an example in which $\lambda_1$=1,560 nm and $\lambda_2$=803 nm. Curve c1 indicates an example in which $\lambda_1$=1,447 nm and $\lambda_2$=836 nm. Curve d1 indicates an example in which $\lambda_1$=1,344 nm and $\lambda_2$=875 nm. Curve e1 indicates an example in which $\lambda_1$=1,303 nm and $\lambda_2$=893 nm.

This graph indicates that by selecting the appropriate propagation direction and wavelength regions from 64°≦θ≦90°, 0°≦Φ≦90°, 1,303 nm≦$\lambda_1$≦1,610 nm, and 790 nm≦$\lambda_2$<893 nm, an optical wavelength converting apparatus can be provided in which the conversion efficiency does not substantially change even with a change in the wavelength of the second LD. FIG. 7 shows the case in which $\lambda_3$=530 nm. If the range of $\lambda_3$ is widened to 500 nm≦λ<550 nm, the wavelength regions of $\lambda_1$ and $\lambda_2$ will be 1,220 nm≦$k_1$≦1,745 nm and 701 nm≦$\lambda_2$≦1,002 nm. Thus, the selectable wavelength ranges increase compared to the first and second examples. This enables the selection of an advantageous wavelength band in producing apparatuses and conditions required for more excellent performance.

In the specific example described below, two LDs are selected so that $\lambda_1$=1,550 nm and $\lambda_2$=808 nm. These wavelengths are commonly used for optical communication and solid pumping. They are expected to enable mass production to reduce costs.

Figure 6:
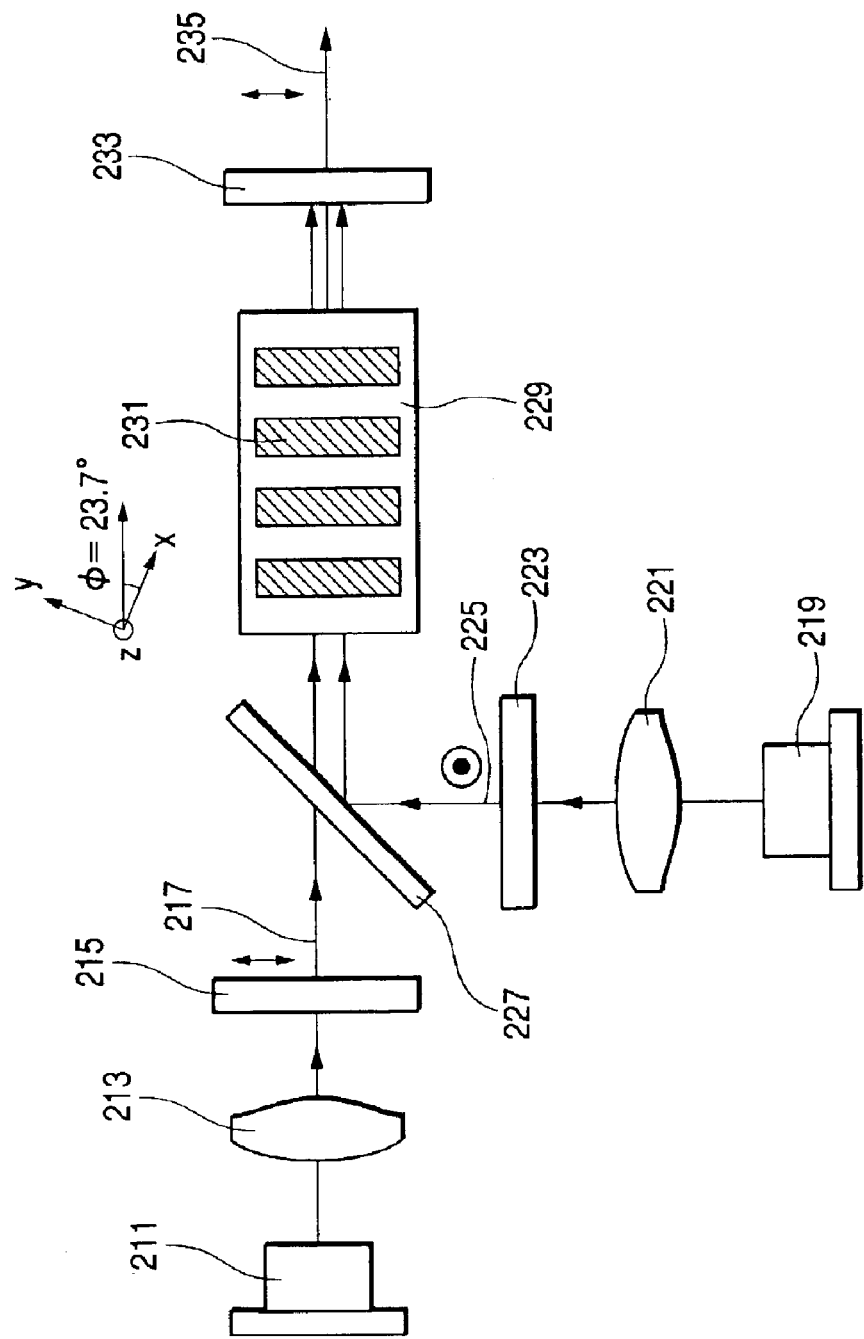
FIG. 6 is a schematic diagram of a configuration of an optical wavelength converting apparatus according to a third example of the present invention.

Description will be given with reference to FIG. 6. FIG. 6 is a schematic diagram of a configuration of an optical wavelength converting apparatus according to the third example of the present invention. In FIG. 6, reference numerals 211 and 219 denote a first and second LDs, reference numerals 213 and 221 denote collimate lenses, and reference numerals 215 and 223 denote half wavelength plates. Reference numerals 227 and 229 denote a dichroic mirror and nonlinear optical material consisting of a KTP crystal, respectively. Reference numerals 231 and 233 denote a periodically poled structure provided in the KTP and a wavelength filter, respectively.

In the present example, the propagation direction is set so that θ=90° and φ=23.7°. Then, according to this setting, the periodically poled structure 231 is formed and the KTP crystal 229 has its light incoming and outgoing surface optically polished. The first LD 211 is a DFB laser of oscillation wavelength 1,550 nm and power 30 mW. The second LD 219 is a Fabry Perot laser of oscillation wavelength 808 nm and power 5 W. The first LD 211 oscillates in a single-longitudinal mode. It has a variation in wavelength limited to 0.3 nm or less by temperature control. Further, the second LD 219 oscillates in a multi-longitudinal mode and has a spectral width of about 3 nm.

An LD beam 217 from the first LD 211 is adjusted by the half wavelength plate 215 so as to be polarized parallel with an xy face of the KTP crystal 229. Further, an LD beam 225 from the second LD 219 is adjusted by the half wavelength plate 223 so as to be polarized in the direction of z axis of the KTP crystal 229. The dichroic mirror 227 is designed to allow the LD beam 217 to pass through, while reflecting the LD beam 225.

The KTP crystal 229 is provided with the periodically poled structure 231 having a period of 29.4 μm so as to match the phases of the LD beams 217 and 225 with the phase of the sum frequency light 235 of these beams (wavelength: 531 nm). The length of the crystal is 20 nm. The wavelength filter 233 is designed to pass only light with a wavelength close to 531 nm to obtain only the sum frequency light 235.

With such a configuration, both components $d_{24}$ and $d_{15}$ of nonlinear optical coefficient tensor of KTP are used.

As a result, it was possible to obtain green sum frequency light of power 0.8 mW and central wavelength 531 nm. The wavelength width was about 1.25 nm, indicating that sum frequency conversion occurred on all wavelengths of the second LD beam 225 within a wavelength width of 3 nm.

Further, the configuration of the present example is characterized in that the temperature tolerance width of the KTP crystal 229 is very large (that is, the present example corresponds to a fifth example, described later, in which the conversion efficiency does not substantially change even with a change in crystal temperature). When measurements were actually carried out while varying the crystal temperature, the conversion efficiency reached its peak at a crystal temperature of 26° C. It then decreased to half at a crystal temperature of −5° C. and 55° C. Thus, the temperature tolerance width (full width at half maximum) of the crystal was 60° C. This indicates that the configuration of the present example substantially eliminates the need for the adjustment of the crystal temperature and is advantageous in producing apparatus.

FOURTH EXAMPLE

A fourth example of the present invention relates to such an optical wavelength converting apparatus that the conversion efficiency does not substantially change even with a change in the temperature of the KTP crystal.

Figure 8:
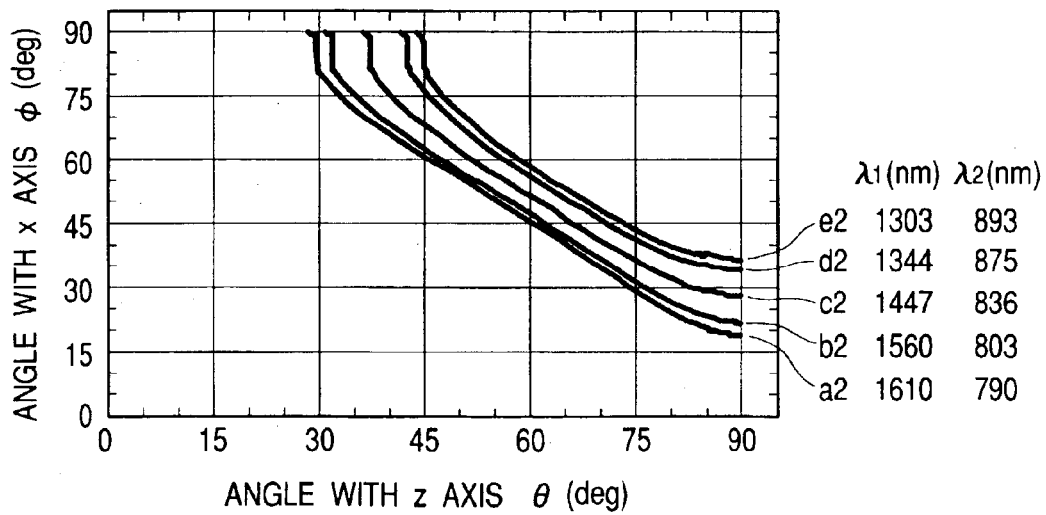
FIG. 8 is a graph showing the direction of propagation vs. the wavelengths of two semiconductor lasers according to a fourth example.

The configuration of this example is substantially the same as that shown in FIG. 6. FIG. 8 shows an example of the relationship between LD wavelengths ($\lambda_1$, $\lambda_2$) meeting Equation (6) and a certain propagation direction (θ, Φ) in the case in which a first LD beam (wavelength $\lambda_1$) is propagated in the polarization direction of a mode 1, while the a second LD beam (wavelength $\lambda_2$) is propagated in the polarization direction of a mode 2, with the sum frequency light of these beams propagated in the polarization direction of the mode 1. In this case, $\lambda_3$=530 nm.

In FIG. 8, curve a2 indicates an example in which $\lambda_1$=1,610 nm and $\lambda_2$=790 nm. Curve b2 indicates an example in which $\lambda_1$=1,560 nm and $\lambda_2$=803 nm. Curve c2 indicates an example in which $\lambda_1$=1,447 nm and $\lambda_2$=836 nm. Curve d2 indicates an example in which $\lambda_1$=1,344 nm and $\lambda_2$=875 nm. Curve d2 indicates an example in which $\lambda_1$=1, 303 nm and $\lambda_2$=893 nm. Curve e2 indicates an example in which $\lambda_1$=1,303 nm and $\lambda_2$=893 nm.

This graph indicates that by selecting the appropriate propagation direction and wavelength regions from 28.3°≦θ≦90°, 19.2°≦φ≦90°, 1,303 nm≦$\lambda_1$≦1,610 nm, and 790 nm≦$\lambda_2$≦893 nm, an optical wavelength converting apparatus can be provided in which the conversion efficiency does not substantially change even with a change in the wavelength of the KTP crystal. FIG. 8 shows the case in which $\lambda_3$=530 nm. However, widening the range of $\lambda_3$ enables the wavelength regions of $\lambda_1$ and $\lambda_2$ to be widened.

FIFTH EXAMPLE

A fifth example of the present invention relates to such an optical wavelength converting apparatus that the conversion efficiency does not substantially increase even with a change in the wavelength of the second LD or in the temperature of the KTP crystal. As already described, the third example constitutes such an optical wavelength converting apparatus. This will be described below with reference to the graph in FIG. 9 in which FIGS. 7 and 8 are superimposed on each other.

Figure 9:
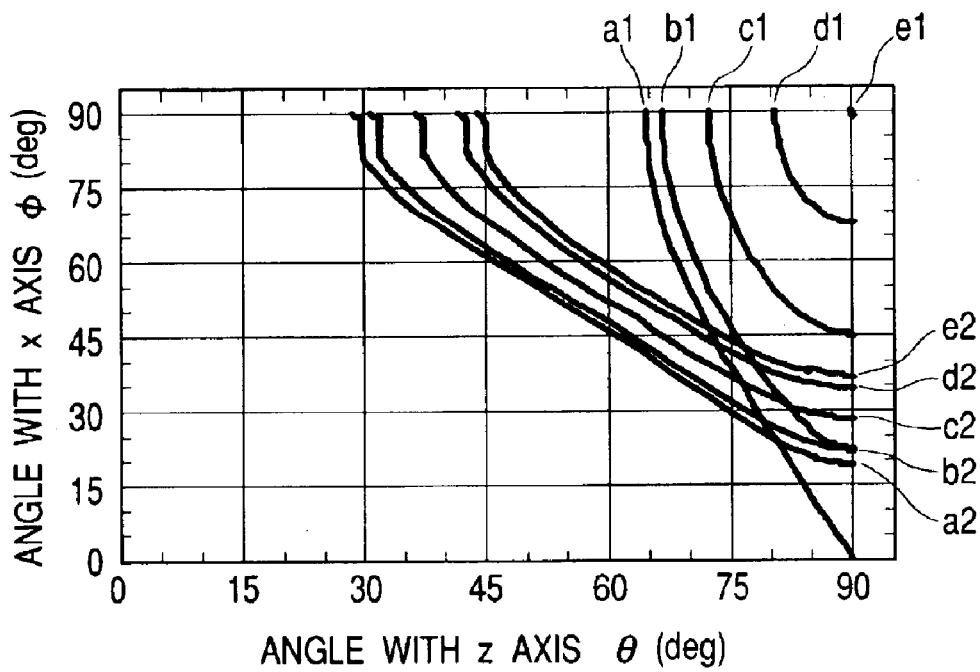

In FIG. 9, the present example corresponds to the intersection between a line (for example, a1) indicating that the conversion efficiency does not substantially change even with a change in wavelength and a line (for example, a2) indicating that the conversion efficiency does not substantially change even with a change in temperature for certain wavelength $\lambda_1$ and $\lambda_2$. The third example is also an example corresponding to this intersection. In this case, $\lambda_3$=530 nm. However, widening the range of $\lambda_3$ to 500 nm≦$\lambda_3$≦550 nm results in an area of intersections such as that shown in FIG. 10.

Figure 10:
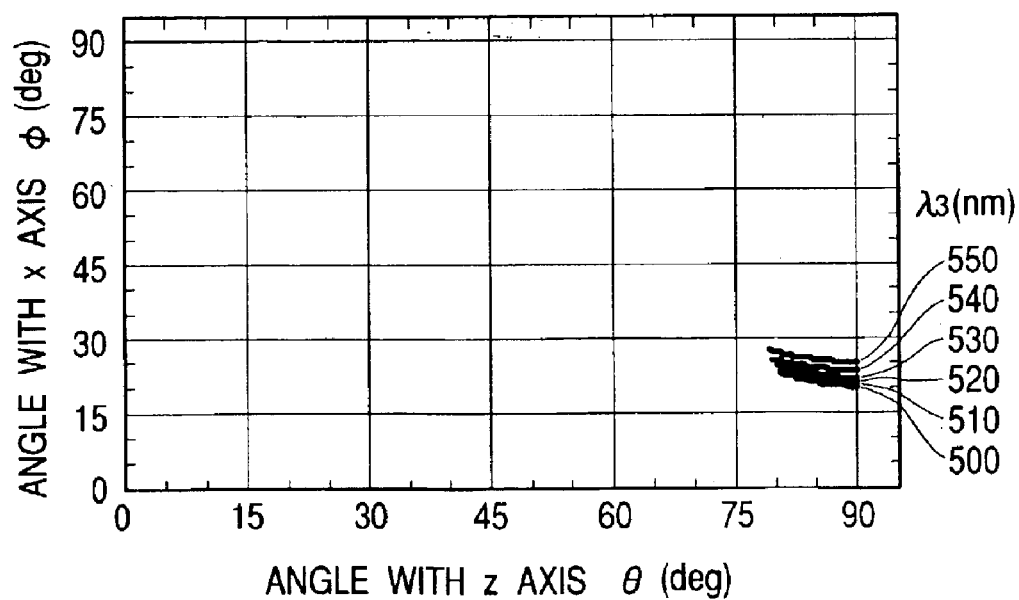
FIG. 10 is a graph showing the direction of propagation vs. the wavelengths of two semiconductor lasers according to a fifth example.

As shown in FIG. 10, in the third example, the polarization direction of beams from the first and second LDs and the sum frequency light of these beams is set so that 79.1°≦θ≦90° and 20.4°≦φ≦27.6°. Further, the wavelengths of the beams from the first and second LDs and the sum frequency light of these beams are set so that 1,460 nm≦$\lambda_1$≦1,745 nm, 701 nm≦$\lambda_2$≦882 nm, and 500 nm<$k_3$≦550 nm. Thus, these values are within the area in FIG. 10. Consequently, an optical wavelength converting apparatus is provided in which the conversion efficiency does not substantially change even with a change in the wavelength of the second LD or in the temperature of the KTP crystal.

SIXTH EXAMPLE

Now, a sixth example according to the present invention will be described with reference to the drawings.

Figure 11:
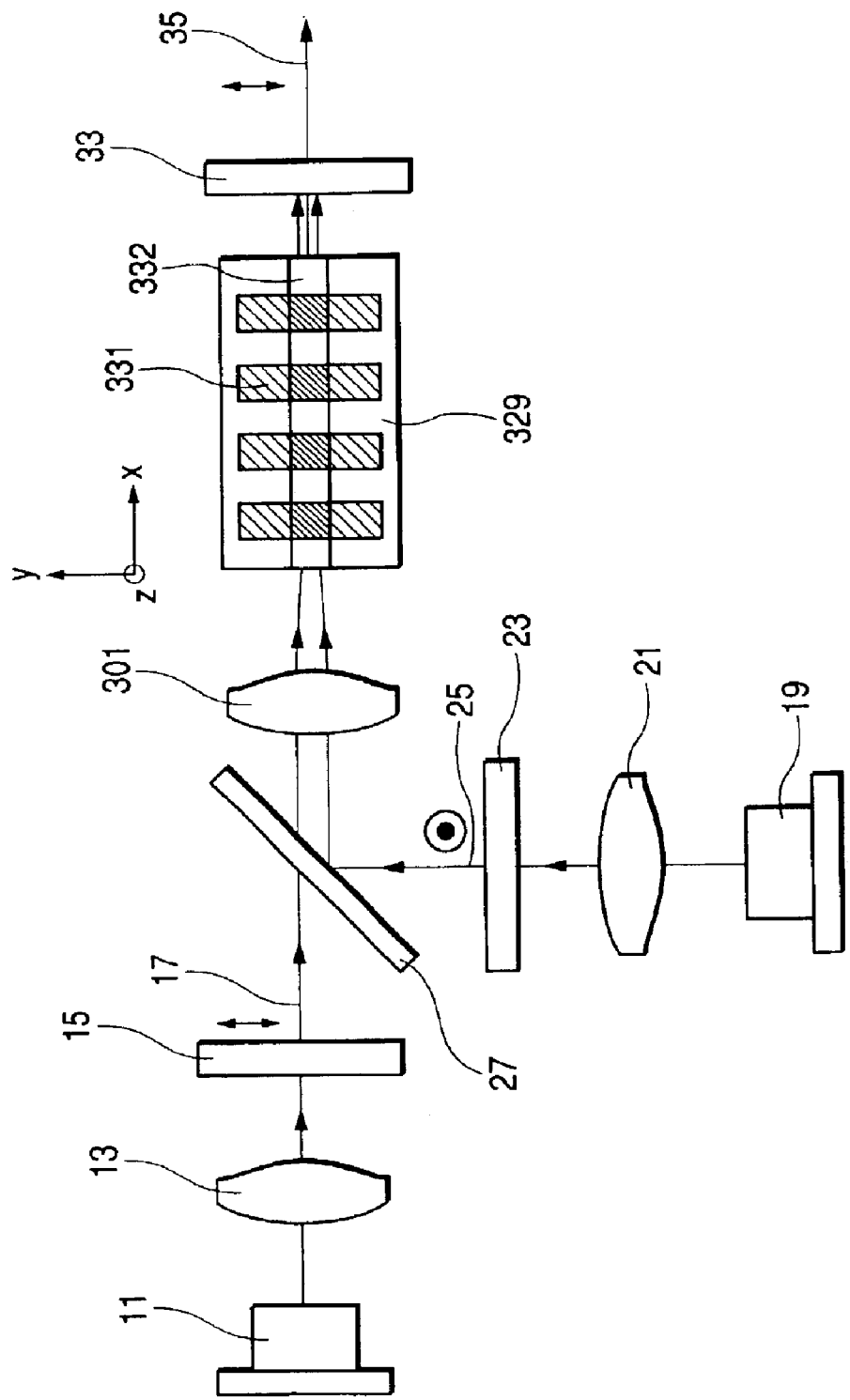
FIG. 11 is a schematic diagram of an optical wavelength converting apparatus according to a sixth example of the present invention.

FIG. 11 is a schematic diagram showing a configuration of an optical wavelength converting apparatus according to the sixth example of the present invention. This configuration is substantially the same as the first example. Detailed description is omitted. The same members are denoted by the same reference numerals.

A difference from the first example is that a KTP crystal 329 is provided with a periodically poled structure 331 and an optical waveguide 332. The optical waveguide 332 has a sectional area of 80 m². A condensing lens 301 is provided to couple the LD beams 17 and 25 to the optical waveguide 332.

The optical power density of LD beams in the KTP crystal 329 in the present example is higher than that in the first example. Since the conversion efficiency is proportional to the optical power density, the optical waveguide structure serves to increase the conversion efficiency.

In the present example, light was allowed to be incident by using a DFB laser of oscillation wavelength 1,610 nm and power 30 W as the first LD 11 and a Fabry Perot laser of oscillation wavelength 790 nm and output 5 W as the second LD 19. Then, it was possible to obtain green sum frequency light 35 of power 30 mW and central wavelength 530 nm.

Further, the wavelength tolerance width (full width at half maximum) of the second LD 19 was 18 nm, which is a sufficient value in a practical sense. Furthermore, with the configuration of the present example, the KTP crystal 329 had a temperature tolerance width (full width at half maximum) of 24° C., which is a relatively large value.

SEVENTH EXAMPLE

In the above described plurality of examples, the KTP crystal is shown as nonlinear optical material. However, other nonlinear optical material may be used. Description of the seventh example will be given of the case in which a KN(KNbO₃) crystal is used as nonlinear optical material.

Figure 12:
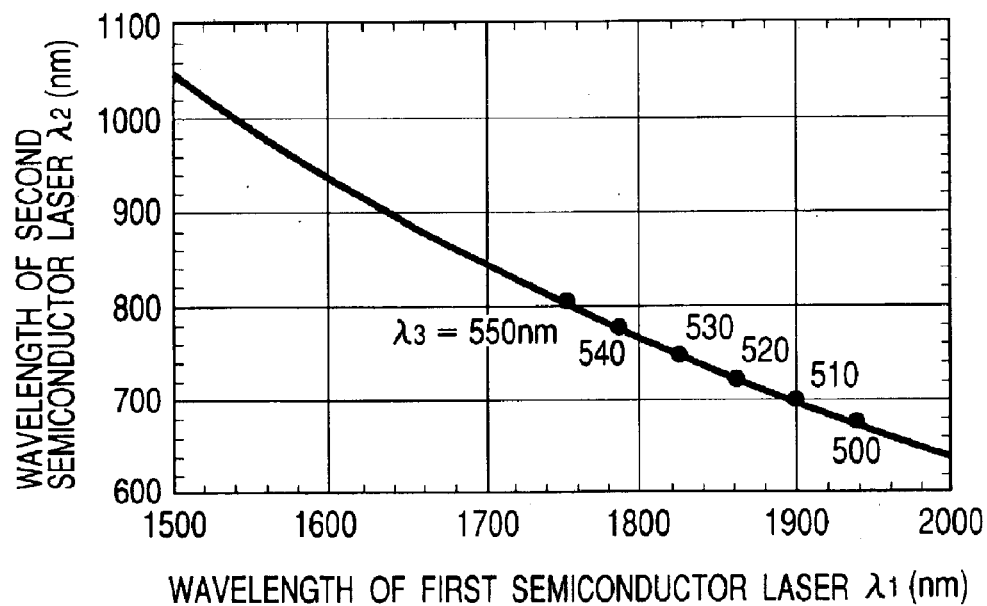
FIG. 12 is a graph showing the correlationship between the wavelengths of two semiconductor lasers according to a seventh example.

KN is a biaxial crystal. The principal axes (x, y, and z axes) are set so that the refractive indices $n_x$, $n_y$, and $n_z$ are such that $n_x<n_y<n_z$. Further, in the polar coordinate expression, an angle with the z axis is defined as θ. An angle with the x axis is defined as φ. If light propagates in this direction, two propagation modes are present: a propagation mode 1 having electric field components in the x axis direction and a propagation mode 2 having electric field components in the z axis direction. In this case, if a beam from the first LD (wavelength $\lambda_1$) is propagated in the propagation mode 2, a beam from the second LD (wavelength $\lambda_2$) is propagated in the propagation mode 2, and the sum frequency light of these beams (wavelength $\lambda_3$) is propagated in the propagation mode 1, then a wavelength range is present which meets Equation (5), described above. This is shown in FIG. 12. For example, to obtain a green laser light (500 nm≦$\lambda_3$≦550 nm) output, the wavelengths may be selected so that 1,751 nm≦$\lambda_1$≦1,939 nm and 674 nm≦$\lambda_2$≦802 nm. Then, an optical wavelength converting apparatus can be provided in which the conversion efficiency does not substantially change even with a change in the wavelength of the second LD.

In this case, the component $d_{13}$ of nonlinear optical coefficient tensor of KN is used. Since KN has a larger nonlinear optical coefficient than KTP, the present example is advantageous in that the crystal length (L) required to obtain the same conversion efficiency can be reduced compared to the first example.

In this regard, the principal axes of the KN crystal may be set so that $n_x>n_y>n_z$. In this case, the propagation and polarization directions may be determined correspondingly.

EIGHTH EXAMPLE

Description will be given of the case in which an LN(LiNbO₃) crystal is used as nonlinear optical material.

LN is a negative uniaxial crystal (with which extraordinary light has a smaller refractive index than ordinary light) The principal z axis is set so that the refractive index for extraordinary light is $n_z$. Further, in the polar coordinate expression, an angle with the z axis is defined as θ. Since the LN is a uniaxial crystal, a plane perpendicular to the z axis is optically equivalent to this axis. As a result, the angle φ is meaningless.

Light is assumed to propagate in a direction perpendicular to the z axis (θ=90°). For convenience, this direction is assumed to be the y axis direction. If light propagates in this direction, two propagation modes are present: a propagation mode 1 (corresponding to extraordinary light) having electric field components in the z axis direction and a propagation mode 2 (corresponding to ordinary light) having electric field components in a direction perpendicular to the z axis direction. In this case, if a beam from the first LD (wavelength $\lambda_1$) is propagated in the propagation mode 2(ordinary light), a beam from the second LD (wavelength $\lambda_2$) is propagated in the propagation mode 2 (ordinary light), and the sum frequency light of these beams (wavelength $\lambda_3$) is propagated in the propagation mode 1(extraordinary light), then a wavelength range is present which meets Equation (5), described above.

Figure 13:
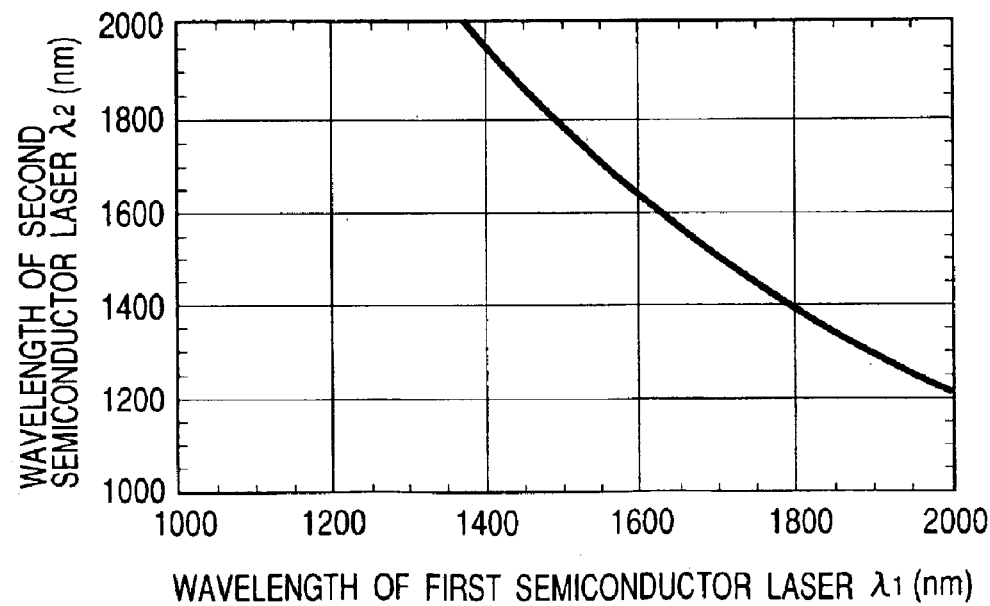
FIG. 13 is a graph showing the correlationship between the wavelengths of two semiconductor lasers according to an eighth example.

This is shown in FIG. 13. Selecting the wavelengths from these ranges provides an optical wavelength converting apparatus in which the conversion efficiency does not substantially change even with a change in the wavelength of the second LD. In this case, the component $d_{31}$ of the nonlinear optical coefficient tensor of LN is used.

For example, the first LD may have a wavelength of 1,900 nm. The second LD may have a wavelength of 1,300 nm. In this case, the sum frequency light has a wavelength of 772 nm. A wavelength band around a wavelength of 1,900 nm is expected to be used as a light source for gas detection. By reducing the wavelength by the sum frequency conversion, the wavelength region can be shifted to one in which an Si photodetector, which is commonly used as a light receiving element, sensitively receives light. This reduces the costs of the light receiving section.

NINTH EXAMPLE

Description will be given of the case in which an LT(LiTaO$_3$) crystal is used as nonlinear optical material.

LT is a positive uniaxial crystal (with which extraordinary light has a smaller refractive index than ordinary light). The principal z axis is set so that the refractive index for extraordinary light is $n_x$. Further, in the polar coordinate expression, an angle with the z axis is defined as θ. Since the LT is a uniaxial crystal, a plane perpendicular to the z axis is optically equivalent to this axis. As a result, the angle φ is meaningless.

Light is assumed to propagate in a direction perpendicular to the z axis (θ=90°). For convenience, this direction is assumed to be the y axis direction. If light propagates in this direction, two propagation modes are present: a propagation mode 1(corresponding to ordinary light) having electric field components in the z axis direction and a propagation mode 2 (corresponding to extraordinary light) having electric field components in a direction perpendicular to the z axis direction. In this case, if a beam from the first LD (wavelength $\lambda_1$) is propagated in the propagation mode 2 (extraordinary light), a beam from the second LD (wavelength $\lambda_2$) is propagated in the propagation mode (extraordinary light), and the sum frequency light of these beams (wavelength $\lambda_3$) is propagated in the propagation mode 2 (extraordinary light), then a wavelength range is present which meets Equation (5), described above.

Figure 14:
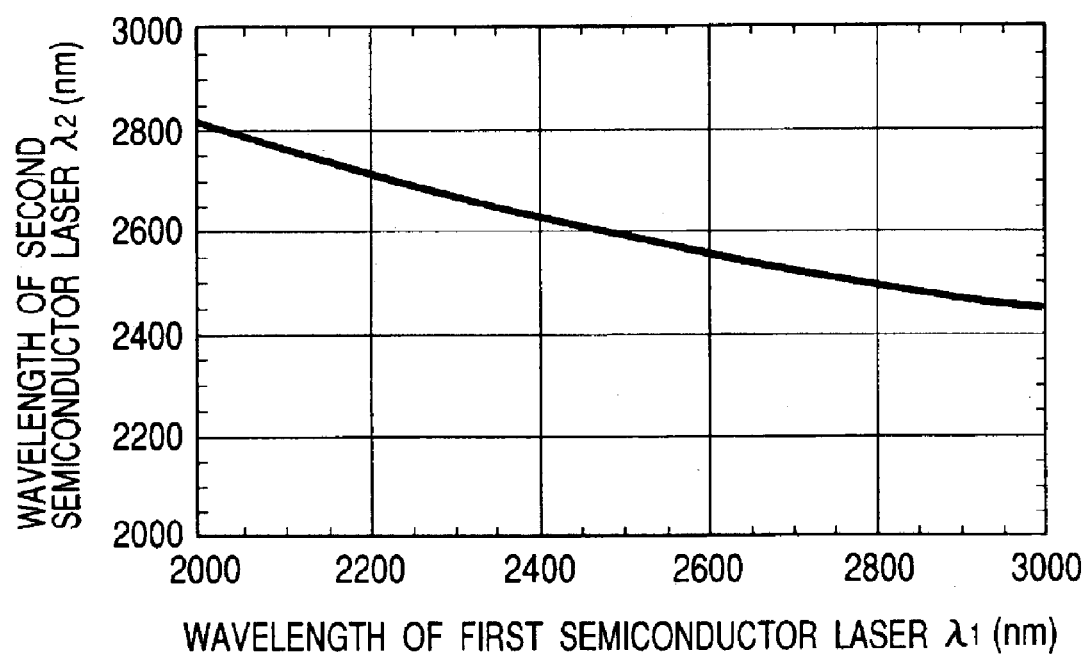
FIG. 14 is a graph showing the correlationship between the wavelengths of two semiconductor lasers according to a ninth example.
Figure 15:
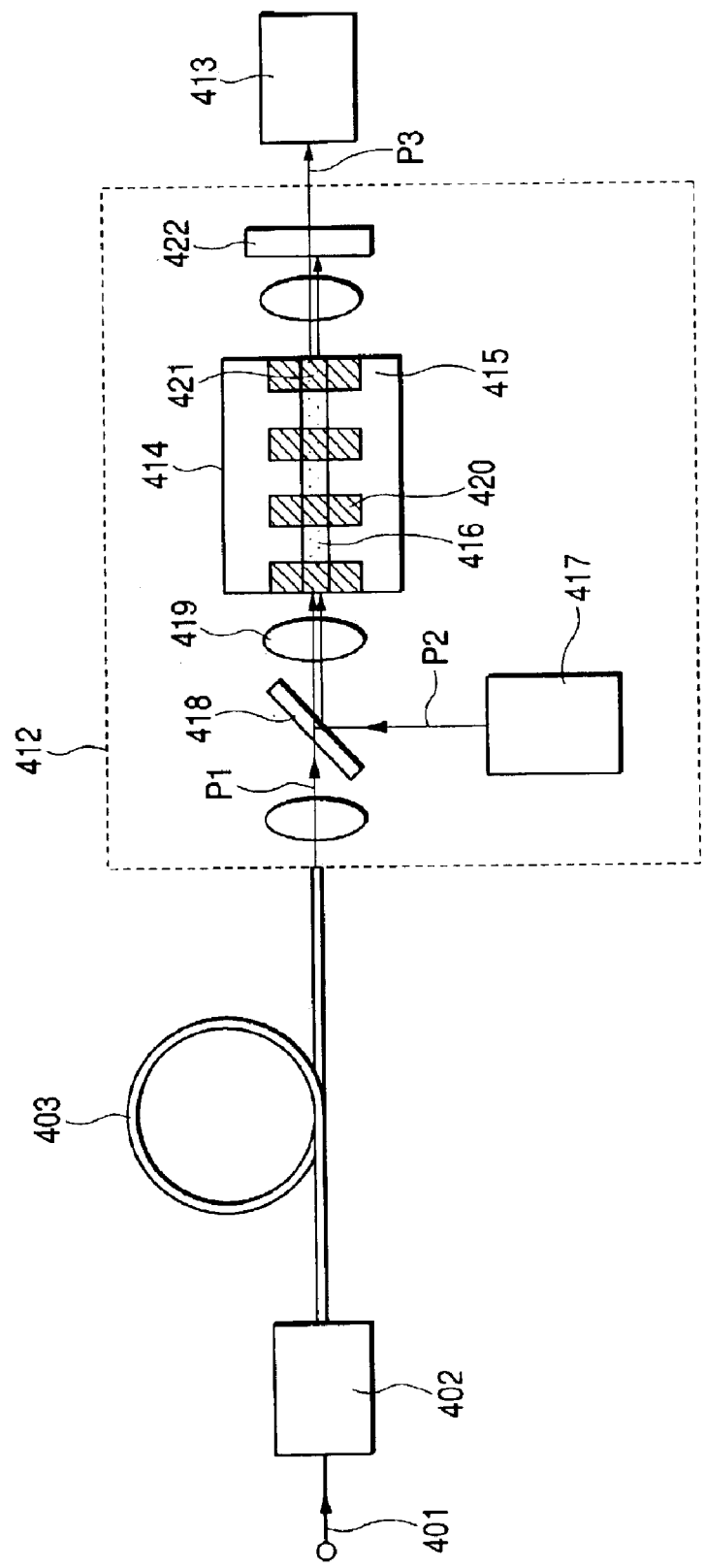
FIG. 15 is a schematic diagram of a configuration of a conventional optical wavelength converting apparatus.

This is shown in FIG. 14. Selecting wavelengths from these ranges provides an optical wavelength converting apparatus in which the conversion efficiency does not substantially change even with a change in the wavelength of the second LD. In this case, the component $d_{33}$ of the nonlinear optical coefficient tensor of LT is used.

The present invention is not limited to the nonlinear optical material shown in the above described plurality of examples. Of course, other nonlinear optical material may be used. Further, the nonlinear optical material may have different compositions, impurity concentrations, and the like and thus different wavelength or temperature distributions of the refractive indices, depending on the manner in which it is grown. However, in this case, the optimum wavelength, propagation direction, and propagation modes may be selected depending on the conditions. Further, in the above examples, the periodically poled structure is used as a periodic structure for phase matching. However, the present invention is not limited to this aspect. It is possible to use a refractive index modulating structure in which the refractive indices are periodically modulated or a structure having the functions of both periodically poled structure and refractive index modulating structure.

As described above, according to the optical wavelength converting apparatus and the optical wavelength converting method according to the present invention, the conversion efficiency does not substantially change even with a change in at least one of the parameters (typically, the wavelength of the exciting light source or the temperature of the nonlinear optical material) defining the efficiency of conversion into sum frequency light. Accordingly, an inexpensive LD not requiring wavelength stability, or the like can be used as an exciting light source. Further, an optical wavelength converting apparatus with high efficiency can be provided which is adapted to be suitable for size reduction and to enable high-speed modulation.

What is claimed is:

1. An optical wavelength converting apparatus comprising first and second light sources and a nonlinear optical material so that beams from the two light sources are allowed to be incident on the nonlinear optical material to generate sum frequency light of these beams, wherein the nonlinear optical material is provided with a periodic structure that matches phases of the beams from the two light sources with a phase of the sum frequency light of these beams, and wherein wavelengths of the beams from the two light sources and of the sum frequency light of these beams, polarization directions of these three beams in the nonlinear optical material, and propagation directions of these three beams in the nonlinear optical material are determined such that an efficiency of conversion into sum frequency light does not change even with a change in at least one of the parameters defining the efficiency of conversion into sum frequency light, wherein wavelengths of the beams from the two light sources and of the sum frequency light of these beams, polarization directions of these three beams in the nonlinear optical material, and propagation directions of these three beams in the nonlinear optical material are determined such that an efficiency of conversion into sum frequency light does not change even with a change in at least one of an oscillation wavelength of the second light source and the temperature of the nonlinear optical material, and wherein when wavelengths of a beam from the first light source, a beam from the second light source, and a sum frequency light of these beams are defined as $\lambda_1$, $\lambda_2$, and $\lambda_3$, refractive indices of the nonlinear optical material for the beams and light (or refractive indices averaged along the light propagation direction) are defined as $n_1$, $n_2$, and $n_3$, respectively, and a phase mismatch amount Δk is defined as follows:

$$\Delta k = n_3(2\pi/\lambda_3) - n_1(2\pi/\lambda_1) - n_2(2\pi/\lambda_2),$$

the periodic structure has a period Λ given by:

$$\Lambda=2\pi/|\Delta k|=1/|n_3/\lambda_3-n_1/\lambda_1-n_2/\lambda_2|, \text{ and}$$

the wavelengths of beams from the first and second light sources and of the sum frequency light of these beams, polarization directions of these three beams in the nonlinear optical material, and propagation directions of these three beams in the nonlinear optical material are determined so as to be:

$$|\partial\Delta k/\partial\lambda_2|\leq 0.05(\mu m^{-2}).$$

2. The optical wavelength converting apparatus according to claim 1, wherein the wavelengths of beams from the first and second light sources and of the sum frequency light of these beams, polarization directions of these three beams in the nonlinear optical material, and propagation directions of these three beams in the nonlinear optical material are determined so as to be:

$$|\partial\Delta k/\partial\lambda_2|\leq 0.01\ (\mu m^{-2}).$$

3. An optical wavelength converting apparatus comprising first and second light sources and a nonlinear optical material so that beams from the two light sources are allowed to be incident on the nonlinear optical material to generate sum frequency light of these beams, wherein the nonlinear optical material is provided with a periodic structure that matches phases of the beams from the two light sources with a phase of the sum frequency light of these beams, and wherein wavelengths of the beams from the two light sources and of the sum frequency light of these beams, polarization directions of these three beams in the nonlinear optical material, and propagation directions of these three beams in the nonlinear optical material are determined such that an efficiency of conversion into sum frequency light does not change even with a change in at least one of the parameters defining the efficiency of conversion into sum frequency light, wherein wavelengths of the beams from the two light sources and of the sum frequency light of these beams, polarization directions of these three beams in the nonlinear optical material, and propagation directions of these three beams in the nonlinear optical material are determined such that an efficiency of conversion into sum frequency light does not change even with a change in at least one of an oscillation wavelength of the second light source and the temperature of the nonlinear optical material, and wherein when wavelengths of a beam from the first light source, a beam from the second light source, and a sum frequency light of these beams are defined as $\lambda_1$, $\lambda_2$, and $\lambda_3$, refractive indices of the nonlinear optical material for the beams and light (or refractive indices averaged along the light propagation direction) are defined as $n_1$, $n_2$, and $n_3$, respectively, and a phase mismatch amount $\Delta k$ is defined as follows:

$$\Delta k=n_3(2\pi/\lambda_3)-n_1(2\pi/\lambda_2)$$

the periodic structure has a period Λ given by:

$$\Lambda=290\ /|\Delta k|=1/|n_3/\lambda_3-n_1/\lambda_1-n_2/\lambda_2|, \text{ and}$$

when a temperature of the nonlinear optical material is defined as T, the wavelengths of beams from the first and second light sources and of the sum frequency light of these beams, polarization directions of these three beams in the nonlinear optical material, and propagation directions of these three beams in the nonlinear optical material are determined so as to be:

$$|\partial\Delta k/\partial T|\leq 0.5\ (K^{-1}cm^{-1}).$$

4. The optical wavelength converting apparatus according to claim 3, wherein the wavelengths of beams from the first and second light sources and of the sum frequency light of these beams, polarization directions of these three beams in the nonlinear optical material, and propagation directions of these three beams in the nonlinear optical material are determined so as to be:

$$|\partial\Delta k/\partial T|\leq 0.1\ (K^{-1}cm^{-1}).$$

5. An optical wavelength converting apparatus comprising first and second light sources and a nonlinear optical material so that beams from the two light sources are allowed to be incident on the nonlinear optical material to generate sum frequency light of these beams, wherein the nonlinear optical material is provided with a periodic structure that matches phases of the beams from the two light sources with a phase of the sum frequency light of these beams, and wherein wavelengths of the beams from the two light sources and of the sum frequency light of these beams, polarization directions of these three beams in the nonlinear optical material, and propagation directions of these three beams in the nonlinear optical material are determined such that an efficiency of conversion into sum frequency light does not change even with a change in at least one of the parameters defining the efficiency of conversion into sum frequency light, wherein the nonlinear optical material is KTiOPO$_4$(KTP), wherein the wavelengths of beams from the first and second light sources and of the sum frequency light of these beams, polarization directions of these three beams in the nonlinear optical material, and propagation directions of these three beams in the nonlinear optical material are determined so as to use a component $d_{24}$ or $d_{15}$ or both of a nonlinear optical coefficient tensor $d_{ij}$ of the nonlinear optical material, and wherein when x, y, and z axes are set as principal axes in the nonlinear optical material and when an angle with the z axis is defined as θ and an angle with the x axis is defined as φ, the propagation direction of beams from the first and second light sources and of the sum frequency light of these beams are set so as to be 64°≦θ≦90° and 0°≦φ≦90°, and when the wavelengths of beams from the first light source, the second light source, and the sum frequency light of these beams are defined as $\lambda_1$, $\lambda_2$, $\lambda_3$, these wavelengths are set so as to be 1,220 nm≦$\lambda_1$≦1,745 nm, 701 nm≦$\lambda_2$≦1,002 nm and 500nm≦$\lambda_3$≦550 nm.

6. The optical wavelength converting apparatus according to claim 5, wherein the propagation direction of beams from the first and second light sources and of the sum frequency light of these beams are θ=90° and φ=0°, the wavelengths of beams from the first and second light sources and of the sum frequency light of these beams are 1,519 nm≦$\lambda_1$≦1,745 nm, 701 nm≦$\lambda_2$≦862 nm, and 500 nm≦$\lambda_3$≦550 nm, and the beam from the first light source is polarized along the y axis, the beam from the second light source is polarized along the z axis, and the sum frequency light is polarized along the y axis.

7. The optical wavelength converting apparatus according to claim 5, wherein the propagation direction of beams from the first and second light sources and of the sum frequency light of these beams are θ=90° and φ=90°, the wavelengths of beams from the first and second light sources and of the sum frequency light of these beams are 1,220 nm≤λ$_1$≤1,421 nm, 772 nm≤λ$_2$≤1,002 nm, and 500 mn≤λ$_3$≤550 nm, and the beam from the first light source is polarized along the x axis, the beam from the second light source is polarized along the z axis, and the sum frequency light is polarized along the x axis.

8. The optical wavelength converting apparatus according to claim 5, wherein when the x, y, and z axes are set as principal axes in the nonlinear optical material and when an angle with the z axis is defined as θ and an angle with the x axis is defined as φ, the propagation direction of beams from the first and second light sources and of the sum frequency light of these beams are set so as to be 79.1°≤θ≤90° and 20.4°≤φ≤27.6°, and the wavelengths of beams from the first and second light sources and of the sum frequency light of these beams are set so as to be 1,460 nm≤λ$_1$≤1745 nm, 701 nm≤λ$_2$≤882 nm, and 500 nm≤λ$_3$≤550 nm.

9. An optical wavelength converting method of using first and second light sources and nonlinear optical material to allow beams from the two light sources to impinge against the nonlinear optical material to generate sum frequency light of these beams, wherein the nonlinear optical material is provided with a periodic structure that matches phases of the beams from the two light sources with a phase of the sum frequency light of these beams, and wherein wavelengths of beams from the two light sources and of the sum frequency light of these beams, polarization directions of these three beams in the nonlinear optical material, and propagation directions of these three beams in the nonlinear optical material are determined such that an efficiency of conversion into sum frequency light does not change even with a change in at least one of parameters defining the efficiency of conversion into sum frequency light, wherein wavelengths of the beams from the two light sources and of the sum frequency light of these beams, polarization directions of these three beams in the nonlinear optical material, and propagation directions of these three beams in the nonlinear optical material are determined such that an efficiency of conversion into sum frequency light does not change even with a change in at least one of an oscillation wavelength of the second light source and the temperature of the nonlinear optical material, and wherein when wavelengths of a beam from the first light source, a beam from the second light source, and a sum frequency light of these beams are defined as λ$_1$, λ$_2$, and λ$_3$, refractive indices of the nonlinear optical material for the beams and light (or refractive indices averaged along the light propagation direction) are defined as n$_1$, n$_2$, and n$_3$, respectively, and a phase mismatch amount Δk is defined as follows:

$$\Delta k = n_3(2\pi/\lambda_3) - n_1(2\pi/\lambda_1) - n_2(2\pi/\lambda_2),$$

the periodic structure has a period Λ given by:

$$\Lambda = 2\pi/|\Delta k| = 1/|n_3/\lambda_3 - n_1/\lambda_1 - n_2/\lambda_2|, \text{ and}$$

the wavelengths of beams from the first and second light sources and of the sum frequency light of these beams, polarization directions of these three beams in the nonlinear optical material, and propagation directions of these three beams in the nonlinear optical material are determined so as to be:

$$|\partial \Delta k/\partial \lambda_2| \leq 0.05 \ (\mu m^{-2}).$$

10. The optical wavelength converting method according to claim 9, wherein the wavelengths of beams from the first and second light sources and of the sum frequency light of these beams, polarization directions of these three beams in the nonlinear optical material, and propagation directions of these three beams in the nonlinear optical material are determined so as to be:

$$|\partial \Delta k/\partial \lambda_2| \leq 0.01 \ (\mu m^{-2}).$$

11. An optical wavelength converting method of using first and second light sources and nonlinear optical material to allow beams from the two light sources to impinge against the nonlinear optical material to generate sum frequency light of these beams, wherein the nonlinear optical material is provided with a periodic structure that matches phases of the beams from the two light sources with a phase of the sum frequency light of these beams, and wherein wavelengths of beams from the two light sources and of the sum frequency light of these beams, polarization directions of these three beams in the nonlinear optical material, and propagation directions of these three beams in the nonlinear optical material are determined such that an efficiency of conversion into sum frequency light does not change even with a change in at least one of parameters defining the efficiency of conversion into sum frequency light, wherein wavelengths of the beams from the two light sources and of the sum frequency light of these beams, polarization directions of these three beams in the nonlinear optical material, and propagation directions of these three beams in the nonlinear optical material are determined such that an efficiency of conversion into sum frequency light does not change even with a change in at least one of an oscillation wavelength of the second light source and the temperature of the nonlinear optical material, and wherein when wavelengths of a beam from the first light source, a beam from the second light source, and a sum frequency light of these beams are defined as λ$_1$, λ$_2$, and λ$_3$, refractive indices of the nonlinear optical material for the beams and light (or refractive indices averaged along the light propagation direction) are defined as n$_1$, n$_2$, and n$_3$, respectively, and a phase mismatch amount Δk is defined as follows:

$$\Delta k = n_3(2\pi/\lambda_3) - n_1(2\pi/\lambda_1) - n_2(2\pi/\lambda_2),$$

the periodic structure has a period Λ given by:

$$\Lambda = 2\pi/|\Delta k| = 1/|n_3/\lambda_3 - n_1/\lambda_1 - n_2/\lambda_2|, \text{ and}$$

when a temperature of the nonlinear optical material is defined as T, the wavelengths of beams from the first and second light sources and of the sum frequency light of these beams, polarization directions of these three beams in the nonlinear optical material, and propagation directions of these three beams in the nonlinear optical material are determined so as to be:

$$|\partial \Delta k/\partial T| \leq 0.5 \ (K^{-1} cm^{-1}).$$

12. The optical wavelength converting method according to claim 11, the wavelengths of beams from the first and second light sources and of the sum frequency light of these beams, polarization directions of these three beams in the nonlinear optical material, and propagation directions of these three beams in the nonlinear optical material are determined so as to be:

$$|\partial \Delta k/\partial T| \leq 0.1 \ (K^{-1} cm^{-1}).$$

* * * * *

UNITED STATES PATENT AND TRADEMARK OFFICE
CERTIFICATE OF CORRECTION

PATENT NO.       : 6,919,985 B2
APPLICATION NO.  : 10/364522
DATED            : July 19, 2005
INVENTOR(S)      : Yukio Furukawa et al.

It is certified that error appears in the above-identified patent and that said Letters Patent is hereby corrected as shown below:

COLUMN 1:

Line 49, "figures," should read --figure,--;
Line 51, "an" should read --a--; and
Line 66, "an" should read --a--.

COLUMN 2:

Line 44, "an" should read --a--.

COLUMN 3:

Line 5, "a" should be deleted.

COLUMN 6:

Line 67, "may selected" should read --may be selected--.

COLUMN 7:

Line 40, "$\partial\Delta k/\partial\phi 0$." should read --$\partial\Delta k/\partial\phi = 0$.--

COLUMN 8:

Line 30, "x axes)" should read --z axes)--.

COLUMN 9:

Line 40, "does no" should read --does not--.

COLUMN 11:

Line 23, "curve al" should read --curve a1--;
Line 33, "790nm $\leqq \lambda_2 <$ 893 nm," should read --790nm $\leqq \lambda_2 \leqq$ 893 nm,--;
Line 38, "nm $\leqq \lambda <$ 550 nm," should read --nm $\leqq \lambda_3 <$ 550 nm,--; and
Line 39, "1,220 nm $\leqq k_1 \leqq$ 1,745 nm" should read
   --1,220 nm $\leqq \lambda_1 \leqq$ 1,745 nm--.

UNITED STATES PATENT AND TRADEMARK OFFICE
CERTIFICATE OF CORRECTION

PATENT NO. : 6,919,985 B2
APPLICATION NO. : 10/364522
DATED : July 19, 2005
INVENTOR(S) : Yukio Furukawa et al.

It is certified that error appears in the above-identified patent and that said Letters Patent is hereby corrected as shown below:

COLUMN 12:

Line 56, "the a" should read --a--; and
Line 67, "Curve d2" should read --Curve e2--.

COLUMN 13:

Line 1, "Curve e2 indicates an example in" should be deleted;
Line 2 should be deleted;
Line 42, "nm $\leq k_3 \leq$ 550 nm." should read --nm $\leq \lambda_3 \leq$ 550 nm.--; and
Line 61, "80m$^2$." should read --80$\mu$m$^2$.--.

COLUMN 15:

Line 40, "$n_x$." should read --$n_z$.--.

COLUMN 17:

Line 58, "$\Delta k = n_3(2\pi/\lambda_3) - n_1(2\pi/\lambda_2)$" should read
--$\Delta k = n_3(2\pi/\lambda_3) - n_1(2\pi/\lambda_1) - n_2(2\pi/\lambda_2)$,--;
Line 62, "$\Lambda = 290/|\Delta k| = 1/|n_3/\lambda_3 - n_1/\lambda_1 - n_2/\lambda_2|$, and" should read
--$\Lambda = 2\pi/|\Delta k| = 1/|n_3/\lambda_3 - n_1/\lambda_1, - n_2/\lambda_2|$, and--.

COLUMN 19:

Line 57, "$\Lambda = 2\pi/|\Delta k| = 1/|n_3/\lambda_3 - n_1/\lambda_1, - n_2/\lambda_2|$, and" should read
--$\Lambda = 2\pi/|\Delta k| = 1/|n_3/\lambda_3 - n_1/\lambda_1, - n_2/\lambda_2|$, and--.

UNITED STATES PATENT AND TRADEMARK OFFICE
CERTIFICATE OF CORRECTION

PATENT NO. : 6,919,985 B2
APPLICATION NO. : 10/364522
DATED : July 19, 2005
INVENTOR(S) : Yukio Furukawa et al.

It is certified that error appears in the above-identified patent and that said Letters Patent is hereby corrected as shown below:

COLUMN 20:

Line 58, "claim 11," should read --claim 11, wherein--.

Signed and Sealed this

Fifth Day of June, 2007

JON W. DUDAS
*Director of the United States Patent and Trademark Office*